US011770571B2

(12) United States Patent
Modarresi et al.

(10) Patent No.: US 11,770,571 B2
(45) Date of Patent: Sep. 26, 2023

(54) MATRIX COMPLETION AND RECOMMENDATION PROVISION WITH DEEP LEARNING

(71) Applicant: Adobe Inc., San Jose, CA (US)

(72) Inventors: Kourosh Modarresi, Santa Clara, CA (US); Jamie Mark Diner, Aventura, FL (US)

(73) Assignee: Adobe Inc., San Jose, CA (US)

( * ) Notice: Subject to any disclaimer, the term of this patent is extended or adjusted under 35 U.S.C. 154(b) by 1541 days.

(21) Appl. No.: 15/866,225

(22) Filed: Jan. 9, 2018

(65) Prior Publication Data

US 2019/0215551 A1 Jul. 11, 2019

(51) Int. Cl.
*G06N 20/00* (2019.01)
*G06F 16/2457* (2019.01)
*G06N 3/08* (2023.01)
*G06N 3/045* (2023.01)
*G06N 20/10* (2019.01)
*G06N 20/20* (2019.01)
(Continued)

(52) U.S. Cl.
CPC . *H04N 21/25875* (2013.01); *G06F 16/24573* (2019.01); *G06N 3/045* (2023.01); *G06N 3/08* (2013.01); *G06N 20/00* (2019.01); *G06N 3/044* (2023.01); *G06N 5/01* (2023.01); *G06N 7/01* (2023.01); *G06N 20/10* (2019.01); *G06N 20/20* (2019.01); *H04M 3/42144* (2013.01)

(58) Field of Classification Search
None
See application file for complete search history.

(56) References Cited

U.S. PATENT DOCUMENTS

2017/0132528 A1* 5/2017 Aslan .................... G06N 20/00
2018/0152487 A1* 5/2018 Griffin ................ H04L 12/1818

OTHER PUBLICATIONS

Josse, Julie, and François Husson. "missMDA: a package for handling missing values in multivariate data analysis." Journal of Statistical Software 70 (2016): 1-31. (Year: 2016).*

(Continued)

*Primary Examiner* — Omar F Fernandez Rivas
*Assistant Examiner* — Chaitanya R Jayakumar
(74) *Attorney, Agent, or Firm* — FIG. 1 Patents

(57) ABSTRACT

Matrix completion and recommendation provision with deep learning is described. A matrix manager system imputes unknown values of incomplete input matrices using deep learning. Unlike conventional techniques, the matrix manager system completes incomplete input matrices using deep learning regardless of whether an input matrix represents numerical, categorical, or a combination of numerical and categorical attributes. To enable a machine-learning model (e.g., an autoencoder) to complete a matrix, the matrix manager system initially encodes the matrix. This involves normalizing known values of numerical attributes and categorically encoding known values of categorical attributes. The matrix manager system performs categorical encoding by replacing information of a given categorical attribute (e.g., an attribute column) with replacement information for each possible value of the attribute (e.g., new columns for each possible value). The machine-learning model imputes the unknown values based on the encoded matrix and masks indicative of unknown values, numerical attributes, and categorical attributes.

20 Claims, 13 Drawing Sheets

(51) Int. Cl.
  *G06N 3/044* (2023.01)
  *G06N 5/01* (2023.01)
  *G06N 7/01* (2023.01)
  *H04N 21/258* (2011.01)
  *H04M 3/42* (2006.01)

(56) References Cited

OTHER PUBLICATIONS

Sedhain, Suvash, et al. "Autorec: Autoencoders meet collaborative filtering." Proceedings of the 24th international conference on World Wide Web. 2015. (Year: 2015).*
Kuklev, Nikita. Robust multivariate analysis methods for single cell Raman spectroscopy. Diss. 2016. (Year: 2016).*
Stekhoven, Daniel J., and Peter Bühlmann. "MissForest—non-parametric missing value imputation for mixed-type data." Bioinformatics 28.1 (2012): 112-118. (Year: 2012).*
Coba, "rrecsys: an R-package for prototyping recommendation algorithms", Sep. 19, 2016 2 pages.
Hastie, "Package 'impute'", Sep. 4, 2017, 5 pages.
Hastie, "Package 'softImpute' Matrix Completion via Iterative Soft-Thresholded SVD", Apr. 8, 2015, 19 pages.
Honaker, "Amelia II: A Program for Missing Data", Journal of Statistical Software, Dec. 2011, vol. 45, Issue 7, Dec. 12, 2011, 47 pages.
Josse, "missMDA: A Package for Handling Missing Values in Multivariate Data Analysis", Journal of Statistical Software. Apr. 2016, vol. 70, Issue 1., Apr. 4, 2016, 31 pages.
Sedhain, "AutoRec: Autoencoders Meet Collaborative Filtering", In Proc. of Int. Conf. on World Wide Web Companion, May 18, 2015, 2 pages.
Stekhoven, "Using the missForest Package", CRAN. 2012, May 2011, 11 pages.
Strub, "Hybrid Collaborative Filtering with Autoencoders", Jul. 19, 2016, 10 pages.
Van"mice: Multivariate Imputation by Chained Equations in R", Journal of Statistical Software, Dec. 2011, vol. 45, Issue 3, Dec. 12, 2011, 67 pages.

* cited by examiner

MATRIX COMPLETION AND RECOMMENDATION PROVISION WITH DEEP LEARNING

BACKGROUND

Noon Advances in computing systems enable content recommendations to be determined and predictive analytics generated based on data, which is often represented in the form of matrices. These matrices are often formatted having rows that represent users (or other items) and columns representing the items' features, attributes, or activities By way of example, a video recommendation system may recommend digital videos to client device users, in part, by leveraging a data matrix. Such a matrix can represent the client device users and a catalog of digital videos and also include values indicative of user ratings of the digital videos. In this scenario it is unlikely, however, that each client device user will have viewed (and also rated) each digital video of the catalog. Based on this, at least some of the user ratings for the digital videos will be unknown. Indeed, many datasets have unknown values for at least some attributes that can be used to describe items in the dataset. To determine recommendations or generate predictive analytics from a dataset, however, many techniques rely on a complete matrix, without unknown values. After completing the matrix—by computing the unknown attributes (e.g., user ratings)—recommendation of the items can be implemented by recommending videos rated above a threshold rating score.

Some conventional systems for providing matrices without unknown values simply remove items from a matrix having unknown values, e.g., each row corresponding to a client device user that has not rated each digital video of the catalog. In many applications, such as applications related to online user behavior, this is likely to result in removal of most items, because the data collected for most items is sparse. Other conventional systems determine an average attribute value (e.g., mean or median) for a given attribute. These systems then simply enter the determined average into each cell corresponding to the given attribute and missing a value. Simply entering this average changes a distribution of attribute values and increases a bias of a model generated based on the data. Accordingly, conventional systems may fail to provide complete matrices having accurate predictions of unknown data. This can lead to recommendations that do not match actual tastes of client device users and predictive analytics that are incorrect—and thus not useful for making decisions based on those analytics.

SUMMARY

To overcome these problems, matrix completion and recommendation provision with deep learning is leveraged in a digital medium environment. Broadly speaking, a matrix manager system imputes unknown values of incomplete input matrices using deep learning. Unlike conventional techniques, the matrix manager system is capable of completing an incomplete matrix using deep learning regardless of whether the incomplete matrix includes attributes that are numerical, categorical, or a combination of numerical and categorical. To enable a machine-learning model (e.g., an autoencoder) to complete an input matrix, the matrix manager system initially encodes the matrix. This involves normalizing known values of numerical attributes and categorically encoding known values of categorical attributes. The matrix manager system performs categorical encoding by replacing information of a given categorical attribute (e.g., an attribute column) with replacement information for each possible value of the categorical attribute (e.g., new columns for each possible value). The machine learning model imputes the unknown values based on the encoded matrix and on masks indicative of unknown values, numerical attributes, and categorical attributes.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
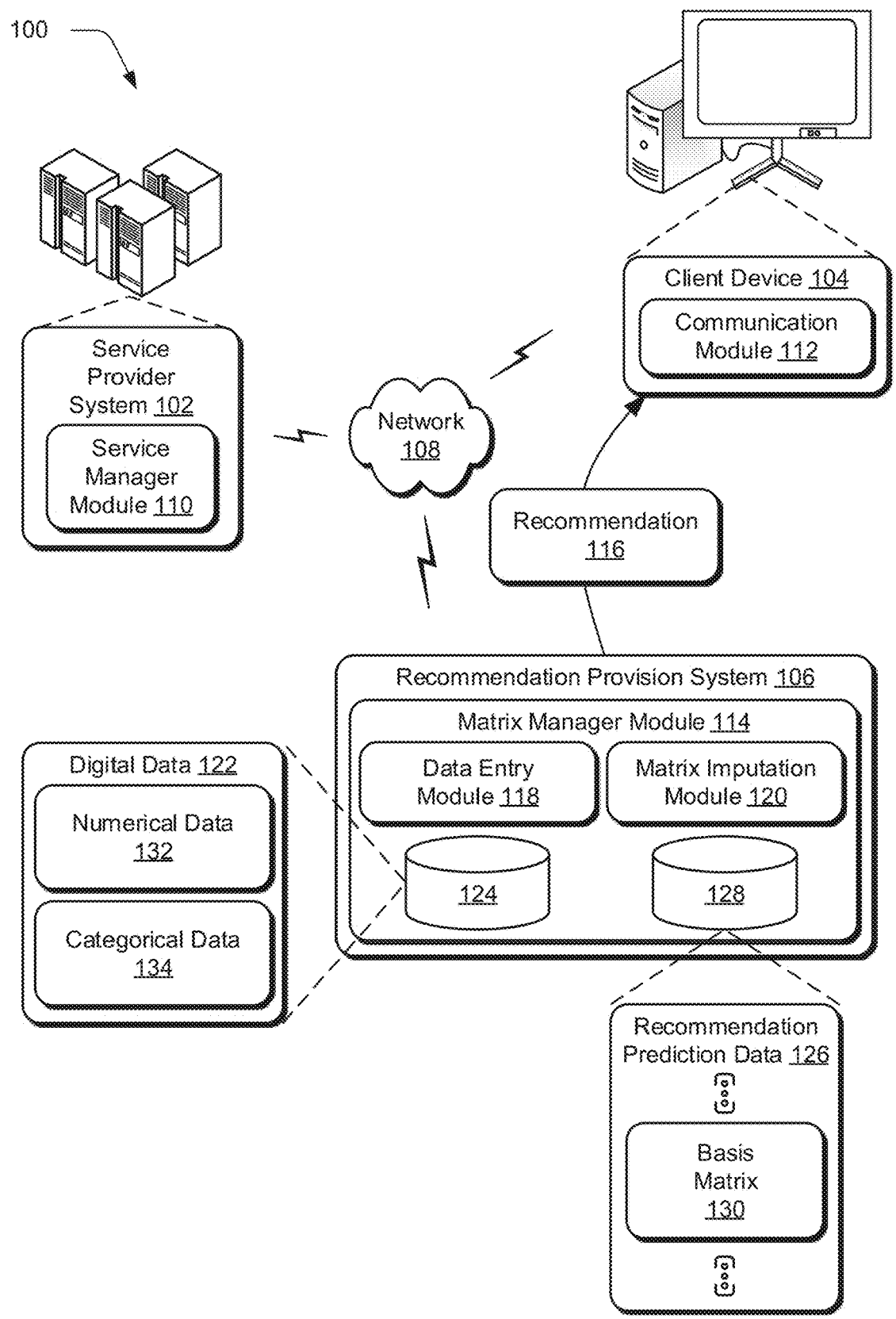
FIG. 1 is an illustration of an environment in an example implementation that is operable to employ techniques described herein.

Advances in computing systems enable content recommendations to be determined and predictive analytics generated based on matrices. To determine these recommendations and generate predictive analytics from a dataset, many techniques rely on a complete matrix, without unknown values. However, many datasets have unknown values for at least some attributes, resulting in incomplete matrices. Some conventional systems for providing matrices without unknown values simply remove items that have an unknown value, e.g., each matrix row that represents an item missing even a single value for an attribute. In many applications, such as applications related to online user behavior, this is likely to result in removal of most items, because the data collected for these items is generally sparse. Other conventionally configured systems determine an average attribute value (e.g., mean or median) for a given attribute, and enter this average attribute value for any items missing a value of the given attribute. Simply entering this average changes a distribution of attribute values and increases a bias of a model generated based on the data. Accordingly, conventional systems may fail to provide complete matrices having accurate predictions of unknown data.

To overcome these problems, matrix completion and recommendation provision with deep learning is leveraged in a digital medium environment. Broadly speaking, a matrix manager system imputes unknown values of incomplete input matrices using deep learning. Unlike conventional techniques, the matrix manager system is capable of completing an incomplete matrix using deep learning regardless of whether the incomplete matrix includes attributes that are numerical, categorical, or a combination of numerical and categorical.

In general, the matrix manager system leverages a machine-learning model, such as a trained autoencoder, for determining values of an incomplete matrix's cells that have unknown values. Machine-learning models, such as autoencoders, generally are capable of operating on numerical data ranging from zero to one. Most attributes that can be used to describe items, though, do not do so merely with numerical values from zero to one. Consider an attribute that is used to describe a country of residence of client device users, for instance. The possible values of this attribute may correspond to multiple different text strings each indicative of a different country, but these values are neither numerical in form nor do they range from zero to one. Based on this, the matrix manager system initially encodes the incomplete matrix so that the known values can be input to the machine-learning model.

The matrix manager system encodes the incomplete matrix and thus generates an encoded incomplete matrix. As part of this encoding, the matrix manager system determines whether each attribute represented by the incomplete matrix corresponds to a numerical or a categorical attribute. This is because the matrix manager system encodes numerical attributes differently from categorical attributes. Broadly speaking, the matrix manager system normalizes the known values of a numerical attribute, e.g., using a normalization technique such as Min Max Scaling. In contrast, the matrix manager system categorically encodes the known values of a categorical attribute, so that the categorically encoded attributes have a value (e.g., '0' or '1') capable of serving as input to the machine-learning model. In one or more implementations, the matrix manager system categorically encodes the categorical attributes using an encoding technique, such as One-Hot encoding.

Once encoded, the encoded incomplete matrix is used as input to the machine-learning model, along with masks indicative of the known and unknown values encoded in the encoded incomplete matrix, the encoded attributes corresponding to numerical attributes, and the encoded attributes corresponding to categorical attributes. This information is used to train the machine-learning model to impute values for the unknown values. In one or more implementations, this training is based on an overall cost function that combines two separate cost functions—one cost function used in connection with numerical attributes and a different cost function used in connection with categorical attributes. The machine-learning model thusly trained outputs a complete encoded matrix in which imputed encoded values replace unknown values.

The matrix manager system then decodes the output of the machine-learning model to generate a complete matrix. Broadly speaking, this decoding reverses the encoding performed to prepare the incomplete matrix for input to the machine-learning model. Among other operations, the matrix manager system denormalizes the numerical attributes, reverses the categorical encoding as described in more detail below, and rearranges the attributes of the matrix to have a same arrangement as in the incomplete matrix. In other words, the decoding is effective to convert the encoded complete matrix into a complete matrix having same dimensions and values of a same scale as the original incomplete matrix.

The described systems thus support several advantages. For instance, the described matrix manager system is able to use deep learning to impute values for completing a matrix regardless of whether its attributes are numerical, categorical, or a combination of numerical and categorical. Using this deep learning to impute the values leads to predictions for replacing the unknown values that are more accurate than conventional techniques. Accordingly, recommendations and predictive analytics produced using matrices completed according to the described techniques are more likely to be suitable for their intended purpose than those produced using matrices completed according to conventional techniques.

In addition, the described system processes datasets in real-time to generate incomplete matrices and also encodes these matrices in real-time for input to a machine-learning model. This is generally not possible by a human as the data processing and matrix encoding performed by the described system are too onerous given the amount of data in many datasets, e.g., relative to which the described techniques are leveraged. Indeed, humans are not capable of performing these tasks at a speed anywhere nearing real-time. Further, it is not possible for a human to impute unknown values, based on training with the below-described cost functions, at a speed even approaching the speed at which the described machine-learning models are capable of imputing these values.

Term Descriptions

As used herein, the term "item" refers to an entity or thing that is capable of being described by data of a dataset. Examples of items include client device users, candidate locations for new construction, particular computing devices, employees, items of digital content (e.g., digital images, digital videos, digital audio, and so forth), web pages and web sites, businesses and departments of businesses, and so forth. Clearly this list of examples does not serve limit the extent of the entities or things that can be considered "items" in the spirit or scope of the technique described herein. Items can correspond to various different entities or things that are capable of being represented by a row or a column of a matrix.

As used herein, the term "attribute" refers to any characteristic that can be used to describe items when associated with a value. In a scenario where the items being described are client device users, an attribute may correspond to any characteristic that is usable to describe each client device user. Examples of attributes related to this scenario may include country of residence, mobile device platform, estimated income, age, social-networking engagement score, percentile for time spent online, and so on. Indeed, a variety of different attributes can be used to describe client device users. Expanding this to all items that can be represented by a matrix, attributes may correspond to a variety of different characteristics without departing from the spirit or scope of the technique described herein. Individual attributes are also capable of being represented by a row or a column of a matrix, such that a cell corresponding to an individual attribute can be populated with different values (e.g., numerical values or text values) and thus describe an item also corresponding to the cell.

As used herein, a "numerical" attribute refers to an attribute that can have a value from a numerical range. Examples of continuous numerical attributes include income, age, various scores, percentiles, timestamps, and so forth. In one or more implementations, a numerical attribute further refers to a numerical attribute having more than five possible values. Numerical attributes may also be discrete, e.g., a number of cars in a household, number of associated computing devices, and so forth. Various numerical attributes, including a great many not described herein, may be used in accordance with the described techniques without departing from their spirit or scope.

In contrast to a "numerical" attribute, the term "categorical" attribute as used herein refers to an attribute that has a non-numerical (not a number) value. Examples of categorical attributes include country of residence, city, true-false-type attributes (e.g., indicative of whether a client device user has opted into a service or clicked on a delivered digital content), and so forth. In one or more implementations, a categorical attribute may also refer to numerical attributes having five or fewer possible values. Various categorical attributes, including a great many not described herein, may be used in accordance with the described techniques without departing from their spirit or scope In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ matrix completion and recommendation provision with deep learning as described herein. The illustrated environment 100 includes a service provider system 102, client device 104, and recommendation provision system 106 that are communicatively coupled, one to another, via a network 108.

Computing devices that are usable to implement the service provider system 102, client device 104, and recommendation provision system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 13.

The service provider system 102 is illustrated as including a service manager module 110 that is representative of functionality to provide services accessible via the network 108 that are usable to make products or services available to consumers. The service manager module 110, for instance, may expose a website or other functionality that is accessible via the network 108 by a communication module 112 of the client device 104. The communication module 112, for instance, may be configured as a browser, a network-enabled application, and so on that obtains data from the service provider system 102 via the network 108. This data is employed by the communication module 112 to enable a user of the client device 104 to communicate with the service provider system 102 to obtain information corresponding to the products or services, e.g., web pages with digital videos when the service provider system 102 is a video platform service.

In order to personalize the information provided to the client device users, the service provider system 102 may employ the recommendation provision system 106. Although functionality of the recommendation provision system 106 is illustrated as separate from the service provider system 102, this functionally may also be incorporated as part of the service provider system 102, further divided among other entities, and so forth. The recommendation provision system 106 includes a matrix manager module 114 that is implemented at least partially in hardware of a computing device to provide completed matrices that allow the recommendation system to provide recommendations 116 to the client device 104. These recommendations 116 may recommend content (e.g., videos, music, news articles, and so on) for a user of the client device 104. Alternately or in addition, the recommendations 116 may represent products or services made available for sale, e.g., by the service provider system 102. To provide the recommendations and/or predictive analytics based on completed matrices, the recommendation provision system 106 may leverage one or more machine-learning models.

The recommendation provision system 106 can use any type of machine-learning techniques capable of generating recommendations or predicting analytics based on completed matrices. According to various implementations, such a machine-learning model uses supervised learning, unsupervised learning, or reinforcement learning. For example, the machine-learning model can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. In any case, the recommendation provision system 106 may use machine-learning techniques to continually train and update the machine-learning model (or, in other words, to update a trained machine-learning model) to accurately determine recommendations and analytic predictions.

The recommendations 116 may recommend a variety of different types of items in addition to content, products, and services without departing from the spirit or scope of the described techniques. Furthermore, the functionality of the matrix manager module 114 may be leveraged to provide completed matrices for purposes other than determining recommendations without departing from the spirit or scope of the described techniques, such as for the purpose of providing predictive analytics.

The matrix manager module 114 is illustrated with data entry module 118 and matrix imputation module 120. The data entry module 118 and the matrix imputation module 120 represent functionality to cam/out aspects of generating completed matrices based on digital data 122, which is illustrated in storage 124. As used herein, a "completed" matrix includes a value in each cell. This contrasts with an "incomplete" matrix, which includes at least one cell having an unknown value—a matrix cell may have an unknown value when the digital data 122 does not include a value of an attribute for a particular data instance. Broadly speaking, the matrix manager module 114 leverages the functionality of the data entry module 118 and the matrix imputation module 120 to complete incomplete matrices by imputing values for matrix cells with unknown values. Consider an example in which a matrix is formed having rows that represent users, columns that represent movies, and cells indicative of a corresponding user's rating of a corresponding movie. In a scenario where a user has not rated a movie, there may be no movie rating in the cell (e.g., a null value) this results in a cell with an unknown value. The described techniques can be used to predict the user's rating for the movie, and thus impute a value for the cell.

The illustrated example also includes recommendation prediction data 126, which is illustrated in storage 128. In general, the recommendation prediction data 126 represents data that the recommendation provision system 106 can use to determine the recommendations 116 and provide predictive analytics. In particular, the recommendation prediction data 126 includes basis matrix 130. The basis matrix 130 represents a matrix generated from the digital data 122 by the data entry module 118. In some scenarios, the illustrated basis matrix 130 may be an incomplete matrix—where the functionality of the matrix imputation module 120 has not yet been used to impute values for matrix cells having unknown values. Alternately or in addition, the illustrated basis matrix 130 may be a complete matrix—where the functionality of the matrix imputation module 120 has been used to impute values for matrix cells having unknown values.

With regard specifically to the data entry module 118, it represents functionality to initially generate the basis matrix 130 based on the digital data 122 and enter known values of the digital data 122 into cells of the basis matrix 130. Consider again the example in which the digital data 122 describes client device users and their interactions with a variety of movies, e.g., with a catalog of streamable movies. In this example, the data entry module 118 may generate the basis matrix 130 to have rows that represent users, columns that represent attributes including movies, and at least some cells indicative of a corresponding user's rating of a corresponding movie. The data entry module 118 may initially generate the basis matrix 130 and fill in the cells for which there are known values in the digital data 122. The data entry module 118 may leave the cells for which there are not known values in the digital data 122 empty, e.g., as null values.

As discussed above and below, the matrix imputation module 120 uses deep learning to complete the basis matrix 130 based, in part, on the known values entered into the basis matrix 130. In contrast to conventional techniques, the matrix imputation module 120 is capable of using machine learning to complete the basis matrix 130 when the values correspond to numerical data 132 and/or categorical data 134. Conventional techniques for matrix completion may be capable of completing matrices having attributes corresponding solely to numerical data but not both the numerical data 132 and the categorical data 134. As used herein, "numerical data" refers to data for an attribute that can have a value in a numerical range. Examples of numerical data include income, normalized scores between zero and one, timestamps, and so forth. In contrast, "categorical data" refers to data for an attribute that can have a value from a finite set of values in a category. Examples of categorical data include country of residence, mobile device manufacturer, an attribute indicative of opt-in (or not) to an option, and so forth. Operation of the matrix manager module 114 and its functionality to generate matrices and impute values for completing these matrices is described in detail in the following discussion.

Having considered an example environment, consider now a discussion of some example details of the techniques for content recommendation with deep learning in a digital medium environment in accordance with one or more implementations.

Matrix Completion and Recommendation Provision with Deep Learning

Figure 2:
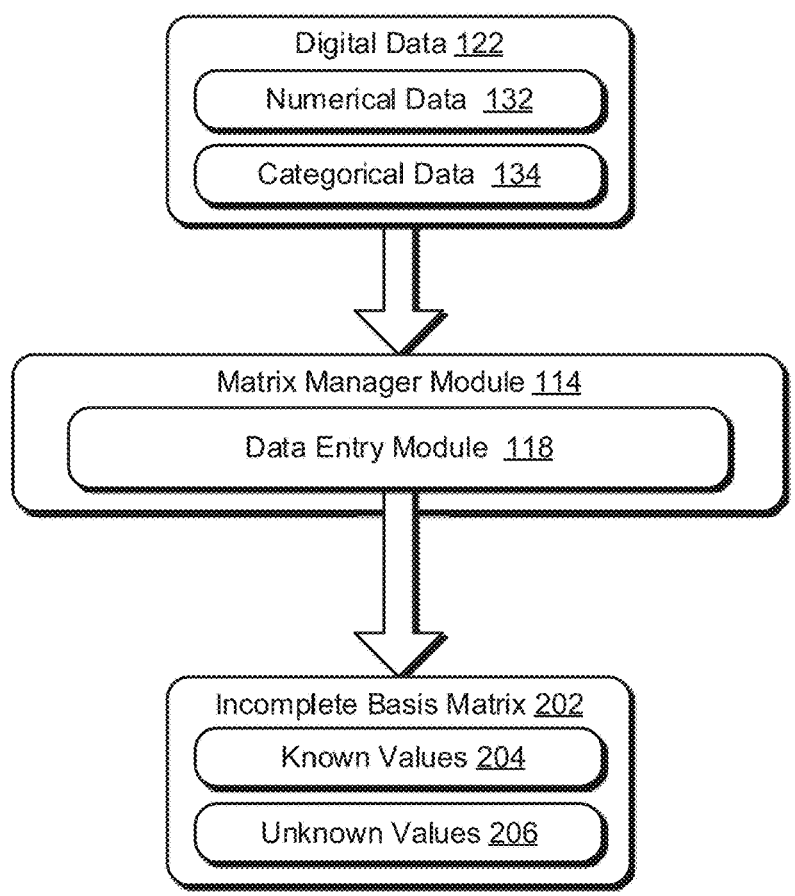
FIG. 2 depicts an example implementation in which a recommendation provision system of FIG. 1 generates a matrix having at least some unknown values.

FIG. 2 depicts an example implementation 200 in which a recommendation provision system of FIG. 1 generates a matrix having at least some unknown values. The illustrated example 200 includes from FIG. 1 the matrix manager module 114 having the data entry module 118 and the digital data 122 having the numerical data 132 and the categorical data 134.

The matrix manager module 114 is depicted obtaining (or otherwise accessing) the digital data 122, e.g., from the storage 124. The matrix manager module 114 obtains the digital data 122 as part of providing the recommendation 116 or as part of determining predictive analytics. Ultimately, the matrix manager module 114 obtains the digital data 122 to generate a matrix which can be used (e.g., by functionality represented by the recommendation provision system 106) as a basis for real-time determination of recommendations, computation of predictive analytics, and so forth. Initially, however, the matrix manager module 114 generates incomplete basis matrix 202.

As noted above, the data entry module 118 enters values into the incomplete basis matrix 202 that are known (present) in the digital data 122. These values are represented as known values 204. The incomplete basis matrix 202 is also depicted with unknown values 206. The unknown values 206 represent cells of the incomplete basis matrix 202 for which the data entry module 118 does not enter values, e.g., because there is no corresponding data in the digital data 122. In contrast to conventional techniques, the matrix manager module 114 is capable of generating the incomplete basis matrix 202—and the data entry module 118 capable of entering values into the cells—to represent at least some of the numerical data 132, at least some of the categorical data 134, or combinations of some numerical and categorical data.

For instance, the matrix manager module 114 may generate the incomplete basis matrix 202 to represent one or both of numerical and categorical attributes and the data entry module 118 can fill the incomplete basis matrix 202 with values present in the digital data 122. Accordingly, the known values 204 may correspond to numerical and/or categorical attributes and therefore include values determined by the data entry module 118 from the numerical data 132 and/or the categorical data 134. The unknown values 206 may thus also correspond to numerical and/or categorical attributes for which the data entry module 118 determines there is no data present in the digital data 122.

Figure 3:
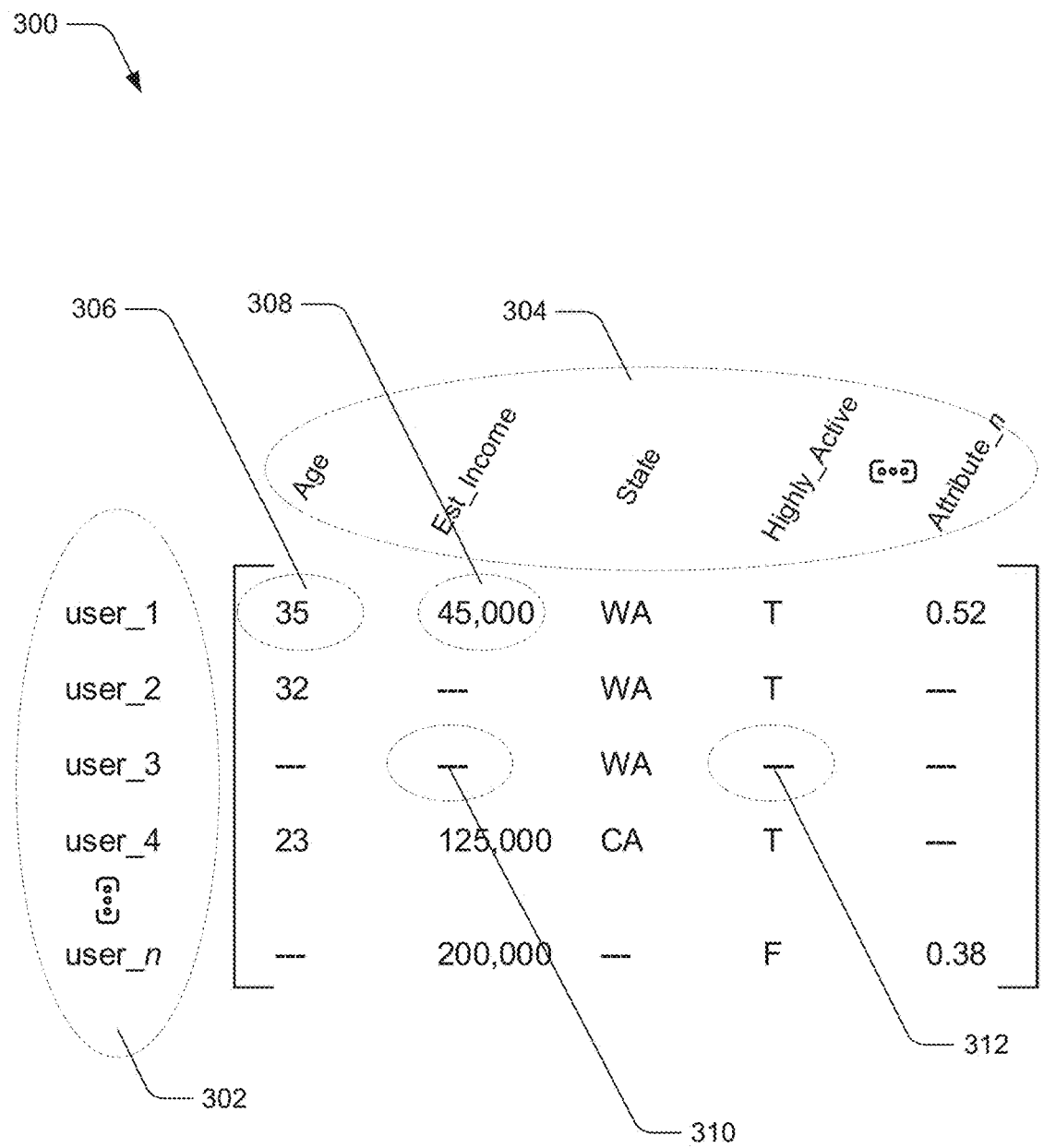
FIG. 3 depicts an example of a matrix with numerical and categorical attributes and having unknown values.

As one example of an incomplete basis matrix, consider FIG. 3. FIG. 3 depicts at 300 an example of a matrix with numerical and categorical attributes and unknown values.

In the illustrated example 300, the rows of the incomplete matrix correspond to users 302 and the columns correspond to different attributes 304 that can be used to describe the users 302. It is to be appreciated that in different scenarios, matrices configured in accordance with the described techniques can have rows and columns representing a variety of different items that can be described by the digital data 122 without departing from the spirit or scope of these techniques. Indeed, computing devices may leverage data incorporated into such matrices for performing a variety of computations—as having a matrix arrangement allows computing devices to leverage the structure of matrices to perform these computations in real-time.

For the sake of explaining the described techniques, the illustrated attributes 304 include a combination of numerical and categorical attributes. By way of example, the attributes 304 include the labels 'Age', 'Est_Income', and 'Attribute_n', which each represent a numerical attribute—an attribute that can take on a value in a numerical range. The attributes 304 of the illustrated example also include labels for 'State' and 'Highly_Active', which each represent categorical attributes. In this particular example, the attribute labeled 'State' may correspond to United States Postal Service (USPS) 2-letter codes for US states, such that the value can be selected from a set including {'AK', 'AK' . . . 'WI', and 'WY'}. The attribute labeled 'Highly_Active' may be used to describe whether the corresponding user is determined to be highly active ('T'— true) or not ('F'—false), such that the value can be selected from the set of {'T', 'F'}.

With respect to known and unknown values, each of the cells of the incomplete matrix that correspond to 'user_1' is depicted with some value. By way of example, first cell 306, which corresponds to the 'Age' attribute 304 of 'user_1', includes a value, e.g., '35'. Second cell 308, which corresponds to the 'Est_Income' attribute 304 of 'user_1', also includes a value, e.g., '45,000. Accordingly, the values in the first and second cells 306, 308 correspond to known values. In a scenario where the incomplete matrix of the illustrated example 300 corresponds to the incomplete basis matrix 202, the values in the first and second cells 306, 308 are thus represented by the known values 204.

In contrast, consider third cell 310 and fourth cell 312. In this example 300, the third cell 310 corresponds to the 'Est_Income' attribute 304 of 'user_3', The illustrated three dashes indicate the absence of a value in a cell of the incomplete matrix, e.g., a null value. Accordingly, there is no value for the 'Est_Income' attribute 304 of 'user_3' in the illustrated incomplete matrix. This may occur, for instance, when the data entry module 118 determines that there is no data present in the digital data 122 that describes 'Est_Income' for 'user_3'. Similarly, the fourth cell 312, which corresponds to the 'Highly_Active' attribute 304 of 'user_3', is also missing a value, e.g., it is depicted with the three dashes indicative of a null value. The values in the third and fourth cells 310, 312 thus correspond to unknown values. In a scenario where the incomplete matrix of the illustrated example 300 corresponds to the incomplete basis matrix 202, the indicated missing values in the third and fourth cells 310, 312 are thus represented by the unknown values 206. As described above and below, the matrix imputation module 120 represents functionality to impute values for these unknown values and complete the matrix so that each cell includes a value. In this context, consider FIG. 4.

Figure 4:
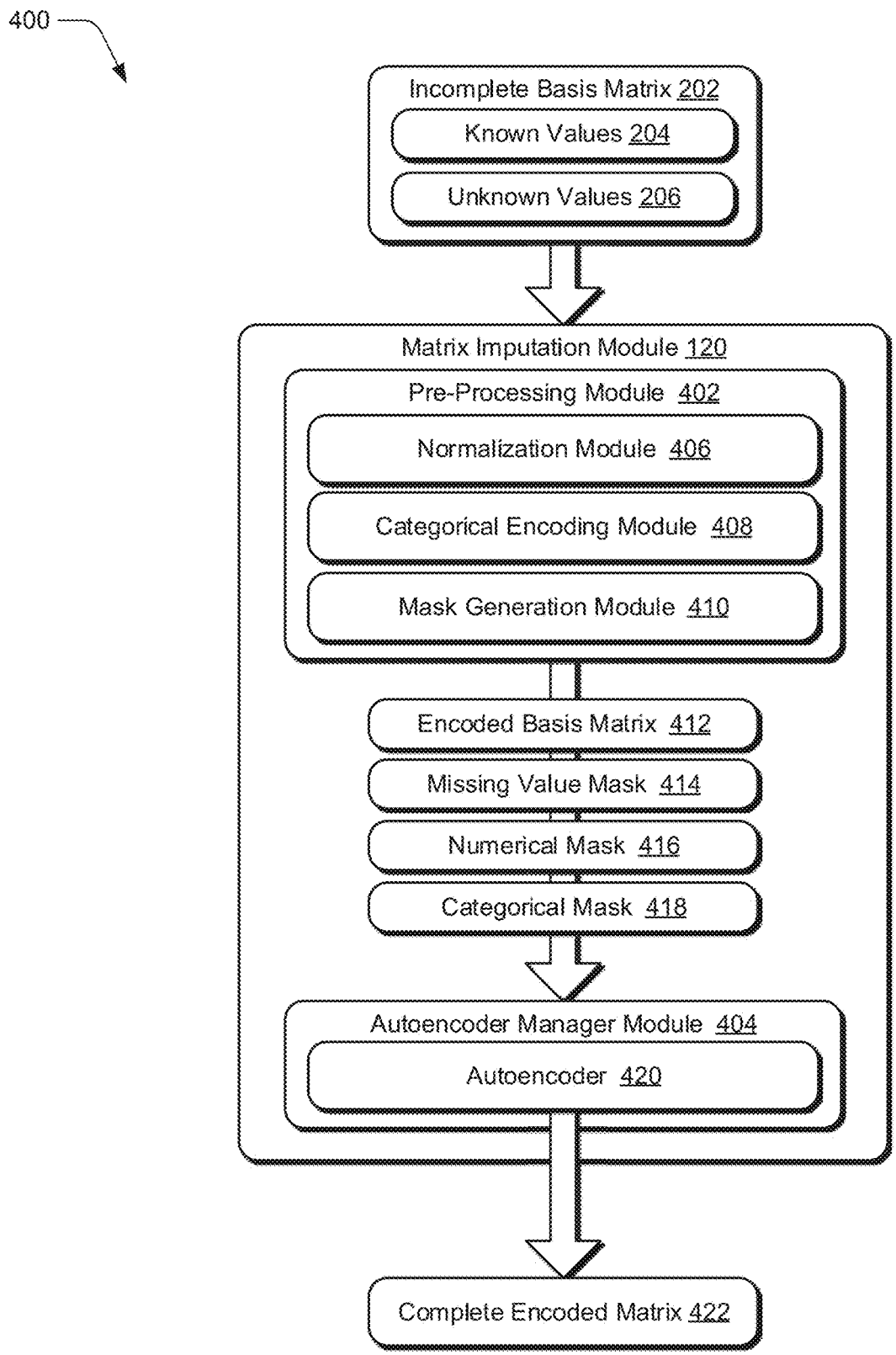
FIG. 4 depicts an example implementation in which the recommendation provision system of FIG. 1 imputes values for unknown values of a matrix to generate a complete encoded matrix.

FIG. 4 depicts an example implementation 400 in which the recommendation provision system of FIG. 1 imputes values for unknown values of a matrix to generate a complete encoded matrix. The illustrated example 400 includes from FIG. 1 the matrix imputation module 120 and from FIG. 2 the incomplete basis matrix 202 with the known and unknown values 204, 206, respectively.

In the illustrated example, the matrix imputation module 120 is shown receiving the incomplete basis matrix 202. Broadly speaking, the matrix imputation module 120 completes the incomplete basis matrix 202 by imputing values for the unknown values 206 based on the known values 204 and using deep learning. As part of imputing the values, the matrix imputation module 120 leverages functionality represented by pre-processing module 402 and autoencoder manager module 404. At a high level, the incomplete basis matrix 202 is completed through three steps: a first step that involves pre-processing the digital data 122 corresponding to the matrix, a second step that involves training an autoencoder to generate encoded values for the unknown values 206, and a third step that involves post-processing the data corresponding to the matrix. Broadly speaking, these first and second steps are handled by the pre-processing module 402 and the autoencoder manager module 404, and are discussed in relation to FIG. 4. The third step—the post-processing step—is further described in relation to FIG. 8.

The pre-processing module 402 represents functionality to encode the incomplete basis matrix 202 and generate additional data so that values can be imputed for the unknown values 206 using deep learning, e.g., an autoencoder. The pre-processing module 402 is depicted with normalization module 406, categorical encoding module 408, and mask generation module 410. In general, the pre-processing module 402 leverages functionality represented by the normalization module 406 and the categorical encoding module 408 to generate encoded basis matrix 412, an example of which is described in relation to FIG. 5. Further, the pre-processing module 402 leverages functionality represented by the mask generation module 410 to generate missing value mask 414, numerical mask 416, and categorical mask 418, examples of which are described in relation to FIGS. 6A and 6B. The encoded basis matrix 412, missing value mask 414, numerical mask 416, and categorical mask 418 serve as input to the autoencoder manager module 404. The autoencoder manager module 404 trains autoencoder 420 to predict values for filling in the unknown values 206 and thus generate complete encoded matrix 422.

With regard to the pre-processing, the pre-processing module 402 pre-processes the incomplete basis matrix 202 by initially determining which attributes represented by the incomplete basis matrix 202 are numerical and which are categorical. In general, the attributes represented by a matrix may be all numerical, all categorical, or may be a combination of numerical and categorical. When a matrix is arranged such that the columns correspond to attributes, as in FIG. 3, the pre-processing module 402 determines whether each column corresponds to a numerical column or a categorical column. When the rows represent attributes, the pre-processing module 402 may make the same determinations for each row. For the sake of convenience, however, the following discussion will assume that matrix columns represent attributes of an item being described—such that the matrix rows each represent those items, e.g., a user, a potential location for a new building, and so forth.

As part of determining whether a column corresponds to a numerical attribute or a categorical attribute, the pre-processing module 402 initially determines whether the values of a given column are not numerical. If the pre-processing module 402 determines it is true that the values of the column are not numerical, then the pre-processing module 402 identifies the column (and the corresponding attribute) as being categorical. If, however, the pre-processing module 402 determines it is false that the values of the column are not numerical (in other words a determination is made that the values are numerical), then the pre-processing module 402 makes a further determination regarding a number of different numerical values that matrix cells of the column can have. If the pre-processing module 402 determines that the number of different numerical values for the column does not exceed a threshold number of numerical values (e.g., five possible numerical values), then the pre-processing module 402 identifies the column (and the corresponding attribute) also as categorical. One example of such an attribute may be a rating from one to three, where a cell value can only be '1', '2', or '3'. In contrast, though, if the pre-processing module 402 determines that the number of different numerical values for the column does exceed this threshold, then the pre-processing module 402 identifies the column (and the corresponding attribute) as being numerical.

Once the attribute type of each column is determined, the pre-processing module 402 leverages the functionality of the normalization module 406 to normalize the known values 204 of the numerical attributes. By way of example, the normalization module 406 may normalize the known values 204 of a numerical attribute using one or more known normalization techniques, such as Min Max Scaling. In so doing, the normalization module 406 converts each of the known values 204 corresponding to a numerical attribute to a value between (and including) zero and one. For each numerical attribute, the normalization module 406 may also be configured to generate and maintain data indicative of the determined minimum and maximum values for the attribute. In one or more implementations, the matrix imputation module 120 uses this information in post-processing, e.g., to rescale values so a reconstructed matrix has a same format as the incomplete basis matrix 202.

After determining the attribute types for the columns, the pre-processing module 402 leverages the functionality of the categorical encoding module 408 to encode the known values 204 of the categorical attributes. In one or more implementations, the pre-processing module 402 rearranges the attributes within the incomplete basis matrix 202 before this encoding. By way of example, the pre-processing module 402 rearranges the columns of the incomplete basis matrix 202 such that all of the numerical attributes are grouped together and all the categorical attributes are grouped together. For instance, the pre-processing module 402 arranges the columns such that the numerical attributes are positioned starting at the leftmost column and all the categorical attributes are positioned to the right of a last numerical attribute column. Alternately, the pre-processing module 402 may arrange the columns such that the categorical attributes are positioned starting at the leftmost column and all the numerical attributes are positioned to the right of a last categorical attribute column.

In any case, the categorical encoding module 408 encodes the categorical attributes so that the corresponding cells of the matrix have numerical values. In one or more implementations, the categorical encoding module 408 encodes each categorical attribute column according to one or more categorical attribute encoding techniques, such as One-Hot encoding. As part of encoding a given categorical attribute column, the categorical encoding module 408 may replace the given categorical attribute column with multiple columns that each correspond to a possible value a cell corresponding to the attribute can have. Consider an example in which a categorical attribute column describes an association of an item with one of the 50 states of the United States (US). Prior to being encoded, each cell of the column may include a value indicative of any one of these 50 different states. To encode this column, however, the categorical encoding module 408 replaces the single column with 50 columns, such that there is one new column for each of the different states, e.g., a column corresponding to Alabama, a column corresponding to Alaska, and so forth. To replace the single column, the categorical encoding module 408 may create 49 new columns and also leverage the original column. This is because for any categorical attribute having m categories, the categorical encoding module may create m−1 new columns in the matrix. This is because the last category can be deduced, or is dependent on, the previous m−1 columns, and so is redundant. However, in this case, since m is large, and also for simplicity, the categorical encoding module 408 simply creates m new columns for any categorical attribute of m categories.

Given this, when a cell in the original column does contain a known value indicative of one of the possible values (e.g., Alaska), the categorical encoding module 408 can enter a value of '1' in the new column corresponding to that possible value (e.g., a '1' in the new Alaska column) and a value of '0' in each of the other columns (e.g., a '0' in the new columns representative of the other 49 states). Where a cell in the original column has an unknown value, the categorical encoding module 408 may simply instantiate cells in each of the new columns corresponding that original cell with an indicator of unknown values, e.g., null value.

In this way, the normalization module 406 and the categorical encoding module 408 are utilized to generate the encoded basis matrix 412 from the incomplete basis matrix 202. It is to be appreciated that the incomplete basis matrix 202 may be encoded in other ways for provision to the autoencoder 420 without departing from the spirit or scope of the described techniques. As one example of the encoded basis matrix 412, consider FIG. 5.

Figure 5:
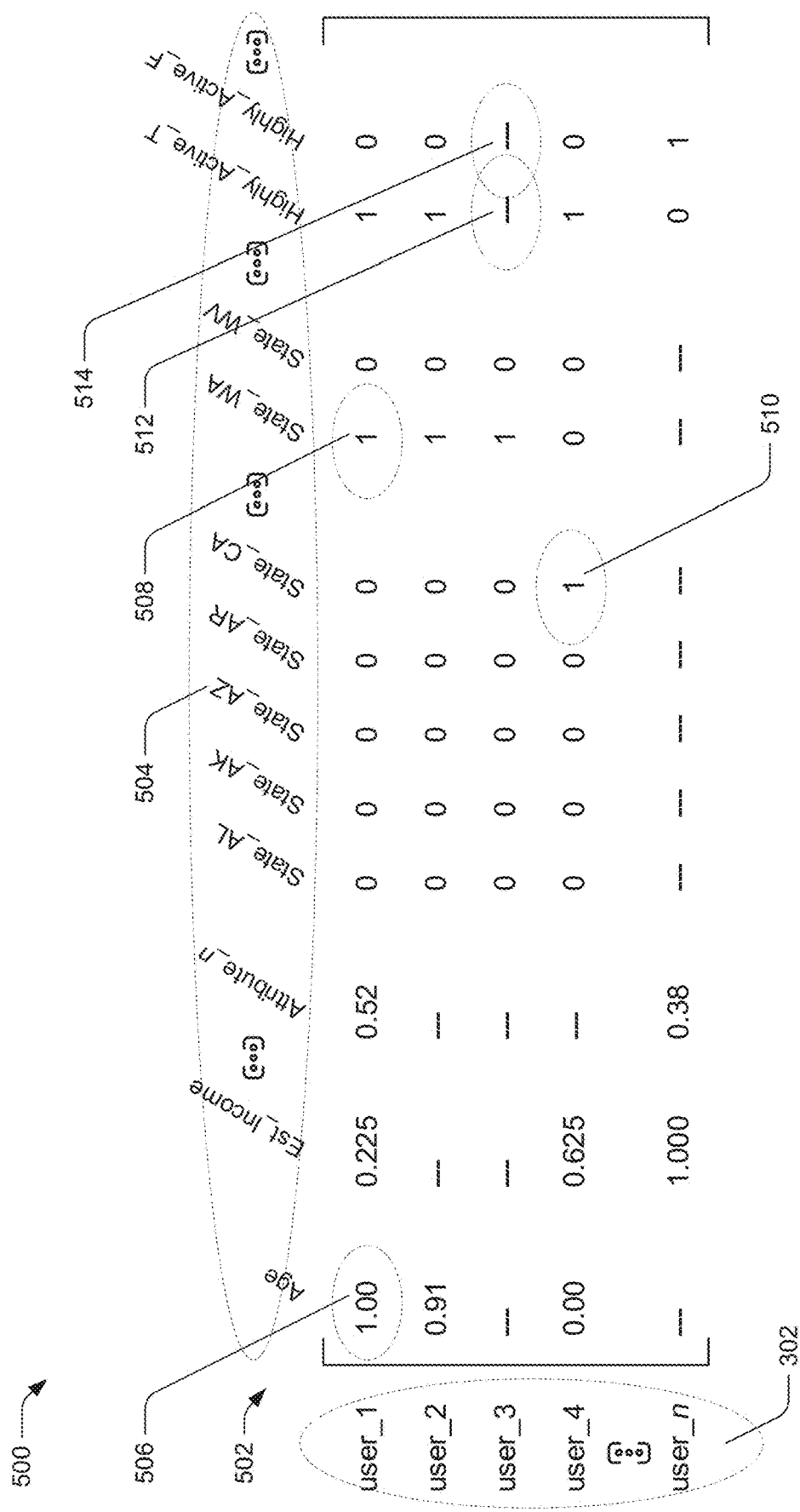
FIG. 5 depicts an example of a matrix that has been transformed to arrange columns of numerical attributes before columns of categorical attributes in the matrix and expand categorical attributes so that they can have numerical values instead of categories.

FIG. 5 depicts at 500 an example of a matrix that has been transformed by arranging columns of numerical attributes before columns of categorical attributes in the matrix and by expanding categorical attributes so that they can have numerical values instead of categories. In particular, FIG. 5 includes incomplete encoded matrix 502, which corresponds to the encoded basis matrix 412 generated from the matrix illustrated in FIG. 3, which corresponds to the incomplete basis matrix 202. FIG. 5 thus represents a continuation of the scenario depicted in FIG. 3.

Like the example depicted in FIG. 3, the incomplete encoded matrix 502 includes rows that correspond to the users 302. The incomplete encoded matrix 502 also includes columns, however, the columns of the incomplete encoded matrix 502 correspond to encoded attributes 504. Like the incomplete matrix of FIG. 3, the illustrated example 500 includes encoded attributes 504 having the labels 'Age', 'Est_Income', and 'Attribute_n', which each represent a normalized numerical attribute. As noted above, the cells of the normalized numerical attributes can have values between and including zero and one. Accordingly, the cells of the encoded attributes 504, corresponding to encoded numerical attributes (and having known values), have values between and including zero and one. Again, the illustrated three dashes in cells of the incomplete encoded matrix 502 represent the unknown values 206, and may be instantiated as null values.

In contrast to the incomplete matrix of FIG. 3, however, the illustrated example 500 does not include the same labels for 'State' and 'Highly_Active', which represent the original categorical attributes. Instead, the incomplete encoded matrix 502 is illustrated with various replacement labels. Rather than including solely the 'State' label, for instance, the encoded attributes 504 are depicted having replacement columns for each possible value of the original column with the 'State' label. In particular, the illustrated example includes the labels 'State_AL', 'State_AK, 'State_AZ', 'State_AR', 'State_CA', 'State_WA', 'State_WV', as well as ellipses ' . . . '. This represents that the incomplete encoded matrix 502 includes a new replacement column corresponding to each value from the above-described USPS 2-letter codes for the US states, e.g., a column for each value in the set including {'AL', 'AK' . . . 'WI', and 'WY' }. In other words, the original attribute column depicted in FIG. 3 is replaced in FIG. 5 with multiple replacement columns having the above-noted labels.

Another characteristic of the incomplete encoded matrix 502 is that the labels for the normalized numerical attributes are arranged within the matrix together and the labels for the encoded categorical attributes are also arranged together. This indicates arrangement of the numerical attributes together and the categorical attributes together. In particular, the illustrated example 500 represents the above-described arrangement in which the encoded attributes 504 are arranged such that the normalized numerical attributes occupy leftmost columns of the incomplete encoded matrix 502 and such that all the encoded categorical attributes are positioned to the right of a last normalized numerical attribute column, e.g., 'Attribute_n'.

With respect to a particular example of normalizing the numerical attributes, consider first encoded cell 506 of the incomplete encoded matrix 502 as it compares to the first cell 306 of the incomplete matrix of FIG. 3. In the illustrated example 500, the first encoded cell 506 is depicted having a value of '1.00,' which corresponds to a largest value of a normalized numerical attribute. Based on this, it may be observed that the value of '35' depicted in the first cell 306 of the incomplete matrix of FIG. 3 corresponds to a largest value for the 'Age' attribute 304.

With respect to a particular example of encoding the categorical attributes, consider second encoded cell 508 of the incomplete encoded matrix 502 as it compares to the 'State' attribute 304 of 'user_1' in the incomplete matrix of FIG. 3. In the illustrated example 500, the second encoded cell 508 is depicted having a value of '1'. This represents that the 'State' attribute 304 for 'user_1' in the incomplete matrix of FIG. 3 has a value of 'WA'. Generally speaking, the column in the incomplete encoded matrix 502 labeled 'State_WA' is used to indicate whether cells of the 'State' attribute correspond to the value 'WA' or not. A value of '0' in one of the encoded State-attribute cells indicates a correspondence with a different state value. For instance, because the cell for 'user_1' corresponding to the 'State' attribute has the value 'WA' (in FIG. 3), the second encoded cell 508 (corresponding to the 'State_WA' encoded attribute) has the value '1' while the other encoded State-attribute cells have the value '0' (representing that 'user_1' is not associated with the other possible values of the 'State' attribute). Similarly, because the cell for 'user_4' corresponding to the 'State' attribute has the value 'CA' (in FIG. 3), third encoded cell 510 (corresponding to the 'State_CA' encoded attribute) has the value '1', while the other encoded State-attribute cells have the value '0'.

With respect to unknown values in the encoded basis matrix, consider fourth encoded cell 512 and fifth encoded cell 514. As noted above, the fourth cell 312 of the incomplete matrix in FIG. 3, which corresponds to the 'Highly_Active' attribute 304 of 'user_3', is missing a value, e.g., it is depicted with the three dashes. In the illustrated example 500, the 'Highly_Active' attribute column is replaced with two columns, one for each of the possible values of the 'Highly_Active' attribute—where values can be selected from the set of {'T', 'F'}. These replacement columns are indicated by the labels 'Highly_Active_T' and 'Highly_Active_F' in the illustrated example 500. Due to the 'Highly_Active' attribute of 'user_3' missing a value in FIG. 3, each of the corresponding cells of the replacement columns for this attribute are also missing a value. In other words, the categorical encoding module 408 enters a null value for the fourth and fifth encoded cells 512, 514.

Note that each cell of the incomplete encoded matrix 502 has a value between zero and one (inclusive) (e.g., the known values 204) or has the three dashes which indicate a null value (e.g., the unknown values 206). Such values, along with the masks introduced above and discussed just below, enable the autoencoder 420 to operate on the data of the encoded basis matrix 412 to impute missing values.

In one or more implementations, these masks include the missing value mask 414, the numerical mask 416, and the categorical mask 418. The mask generation module 410 generates the missing value mask 414 to indicate the cells of the encoded basis matrix 412 that have values and the cells of the encoded basis matrix 412 that are missing values. By way of example, the missing value mask 414 may have a same number of rows, columns, and thus cells as the encoded basis matrix 412. For each cell of the encoded basis matrix 412 having a non-null value (e.g., known normalized and encoded values), the mask generation module 410 may enter a value of '1' into the corresponding cell of the missing value mask 414. Accordingly, for each cell of the encoded basis matrix 412 having a null value (e.g., an unknown normalized or encoded value), the mask generation module 410 may enter a value of '0' into the corresponding cell of the missing value mask 414. The mask generation module 410 may indicate known and unknown values in the missing value mask 414 in other ways without departing from the spirit or scope of the techniques described herein, e.g., the missing value mask 414 may be generated with zeroes in cells corresponding to non-null values of the encoded basis matrix 412 and with ones in cells corresponding to null values of the encoded basis matrix 412.

In addition, the mask generation module 410 generates the numerical mask 416 to indicate numerical attributes of the encoded basis matrix 412. In one or more implementations, the mask generation module 410 configures the numerical mask as a vector, such that there is one cell corresponding to each attribute (e.g., each column) of the encoded basis matrix 412. For each attribute of the encoded basis matrix 412 that is numerical, the mask generation module 410 may enter a value of '1' in the corresponding cell of the numerical mask 416. For each attribute of the encoded basis matrix 412 that corresponds to an encoded categorical attribute, the mask generation module 410 may enter a value of '0' in the corresponding cell of the numerical mask 416. The mask generation module 410 may indicate numerical attributes and categorical attributes in the numerical mask 416 in other ways without departing from the spirit or scope of the techniques described herein, e.g., the numerical mask 416 may be generated with zeros in cells corresponding to numerical attributes and ones in cells corresponding to encoded categorical attributes.

Further, the mask generation module 410 generates the categorical mask 418 to indicate encoded categorical attributes of the encoded basis matrix 412. By way of example, the categorical mask 418 may also correspond to a vector and be configured as the complement of the numerical mask 416. For each attribute of the encoded basis matrix 412 that is an encoded categorical attribute, for instance, the mask generation module 410 may enter a value of '1' in the corresponding cell of the categorical mask 418. For each attribute of the encoded basis matrix 412 that corresponds to a numerical attribute, though, the mask generation module 410 may enter a value of '0' in the corresponding cell of the categorical mask 418. The mask generation module 410 may indicate encoded categorical attributes and numerical attributes in the categorical mask 418 in other ways without departing from the spirit or scope of the techniques described herein, e.g., the categorical mask 418 may be generated with zeros in cells corresponding to encoded categorical attributes and ones in cells corresponding to numerical attributes. As examples of these masks, consider FIGS. 6A and 6B in accordance with the described techniques.

Figure 6A:
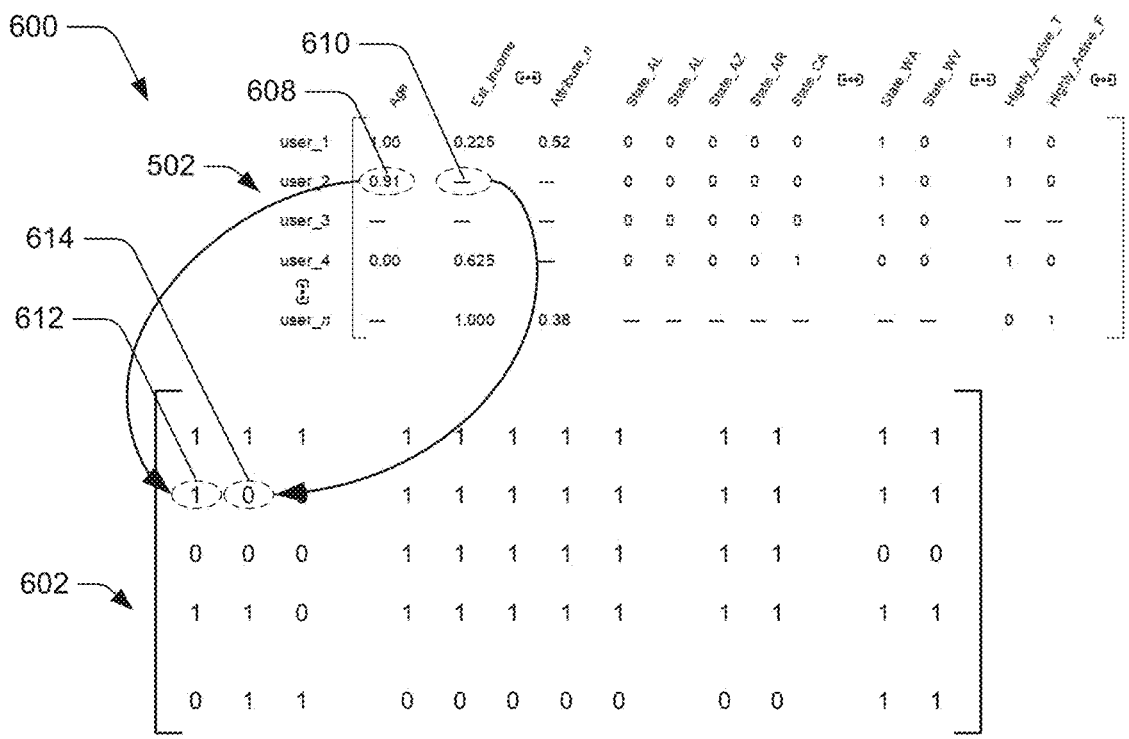
FIGS. 6A and 6B depict examples of masks used in connection with completing a matrix having unknown values of numerical and categorical attributes.
Figure 6B:
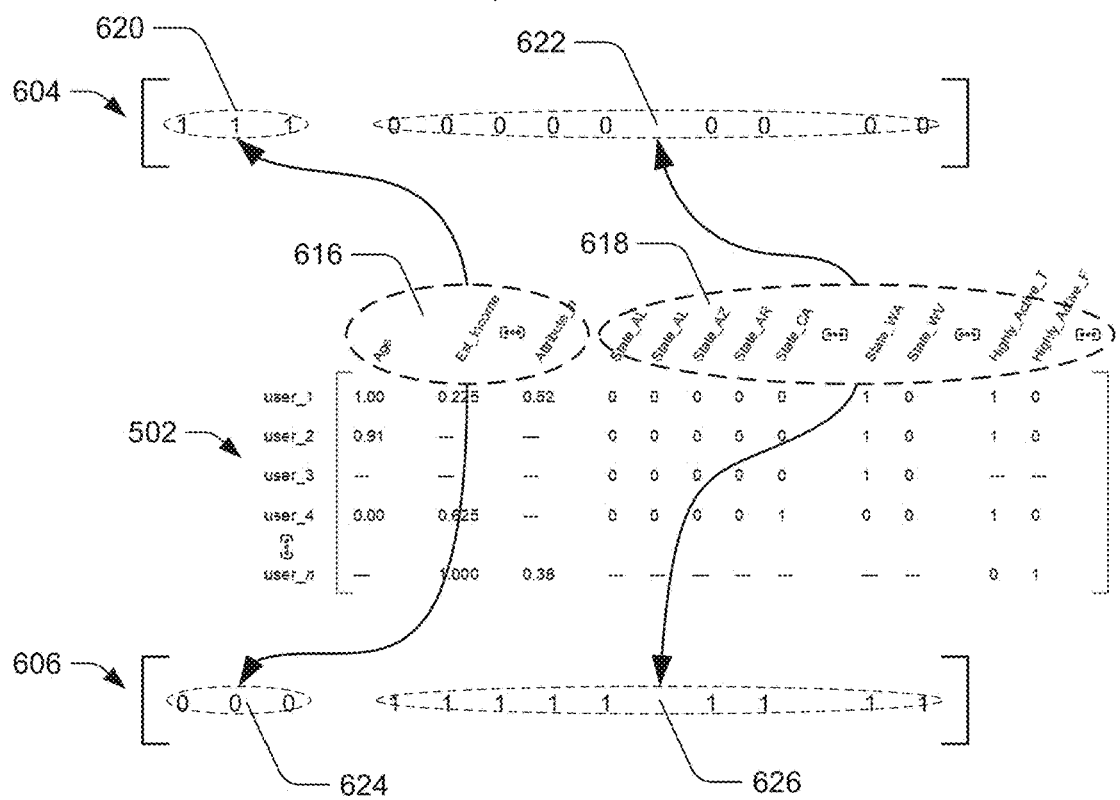

FIGS. 6A and 6B depict examples at 600 of masks used in connection with completing a matrix having unknown values of numerical attributes and categorical attributes. FIGS. 6A and 6B represent a continuation of the scenario discussed in relation to FIG. 5, and each include the incomplete encoded matrix 502 of FIG. 5. In particular, FIG. 6A depicts one example of a missing value mask 602 and FIG. 6B depicts examples of a numerical mask 604 and a categorical mask 606.

Broadly speaking, the missing value mask 602 indicates which cells of the incomplete encoded matrix 502 correspond to known values and which cells of the incomplete encoded matrix 502 correspond to unknown values. To this extent, consider encoded cell 608 and encoded cell 610. The encoded cell 608 is illustrated with a value (e.g., '0.91') while the encoded cell 610 is illustrated with three dashes (e.g., indicative of an unknown value). Consider also first and second missing value mask cells 612, 614, respectively. In this example, the first missing value mask cell 612 includes a value (e.g., '1') indicating that the encoded cell 608 has a known value, and the second missing value mask cell 614 includes a value (e.g., '0') indicating that the encoded cell 610 has an unknown value.

The numerical mask 604 indicates which columns of the incomplete encoded matrix 502 correspond to numerical attributes. In the illustrated example, the numerical mask 604 includes a same number of cells as there are depicted columns of the incomplete encoded matrix 502, such that each cell of the numerical mask 604 is configured to indicate whether a corresponding column of the incomplete encoded matrix 502 corresponds to a numerical attribute or not. To this extent, consider the determined numerical attributes 616 and the determined encoded categorical attributes 618 of the incomplete encoded matrix 502. Consider also first and second groups of cells 620, 622, respectively, of the numerical mask 604. The first group of cells 620 are illustrated each having a value (e.g., '1') indicating that the corresponding column of the incomplete encoded matrix 502 corresponds to a numerical attribute. In contrast, the second group of cells 622 are illustrated each having a value (e.g., '0') indicating that the corresponding column of the incomplete encoded matrix 502 corresponds to a categorical attribute.

The categorical mask 606 indicates which columns of the incomplete encoded matrix 502 correspond to encoded categorical attributes. In the illustrated example, the categorical mask 606 also includes a same number of cells as there are depicted columns of the incomplete encoded matrix 502, such that each cell of the categorical mask 606 is configured to indicate whether a corresponding column of the incomplete encoded matrix 502 corresponds to a categorical attribute or not. To this extent, consider again the determined numerical attributes 616 and the determined encoded categorical attributes 618 of the incomplete encoded matrix 502. Consider also third and fourth groups of cells 624, 626, respectively, of the categorical mask 606. The third group of cells 624 are illustrated each having a value (e.g., '0') indicating that the corresponding column of the incomplete encoded matrix 502 corresponds to a numerical attribute. In contrast, the fourth group of cells 626 are illustrated each having a value (e.g., '1') indicating that the corresponding column of the incomplete encoded matrix 502 corresponds to a categorical attribute. As noted above, the illustrated masks are merely examples of a missing value mask, a numerical mask, and a categorical mask.

In one or more implementations, the pre-processing module 402 further converts each missing value in the encoded basis matrix 412 to zero, e.g., the cells having null values are instead given zero as a value. The pre-processing module 402 may convert the missing values to zero because neural networks, used to impute the missing values, may not be capable of handling missing values. The pre-processing module 402 may also convert the missing values to zero to remove an effect of the missing values on nodes of neural networks. Once the encoded basis matrix 412, the missing value mask 414, the numerical mask 416, and the categorical mask 418 are generated, the autoencoder manager module 404 uses these to train the autoencoder 420.

In accordance with the described techniques, the autoencoder manager module 404 trains the autoencoder 420, in part, by using each column of the encoded basis matrix 412 as input and as output for the autoencoder 420, e.g., in scenarios where the attributes are represented by the matrix columns. The following discussion will continue to be discussed in relation to scenarios where the matrix columns represent the item attributes and the matrix rows represent items (e.g., client device users), though the techniques may also be implemented in scenarios where the matrix rows represent the attributes—and the autoencoder manager module 404 thus uses each column of the encoded basis matrix 412 as input and as output for the autoencoder 420. In any case, continuing the discussion with respect to scenarios where the matrix columns represent attributes, the autoencoder manager module 404 configures the autoencoder 420 to include a number of input nodes equal to a number of columns of the encoded basis matrix 412. The autoencoder manager module 404 also configures the autoencoder 420 to include a number of output nodes equal to the number of columns of the encoded basis matrix 412.

In one or more implementations, the autoencoder manager module 404 generates the autoencoder 420 as a neural network. In such implementations, the autoencoder manager module 404 configures the autoencoder 420 to include a first layer—an input layer of the neural network—to have the number of nodes equal to the number of columns. The autoencoder manager module 404 also configures the autoencoder 420 to include a neural-network output layer having the number of nodes. The autoencoder manager module 404 may configure the autoencoder 420 as a neural network in a variety of ways without departing from the spirit or scope of the techniques described herein, e.g., having varying numbers of hidden layers. As one example configuration of the autoencoder 420 as a neural network, consider FIG. 7.

Figure 7:
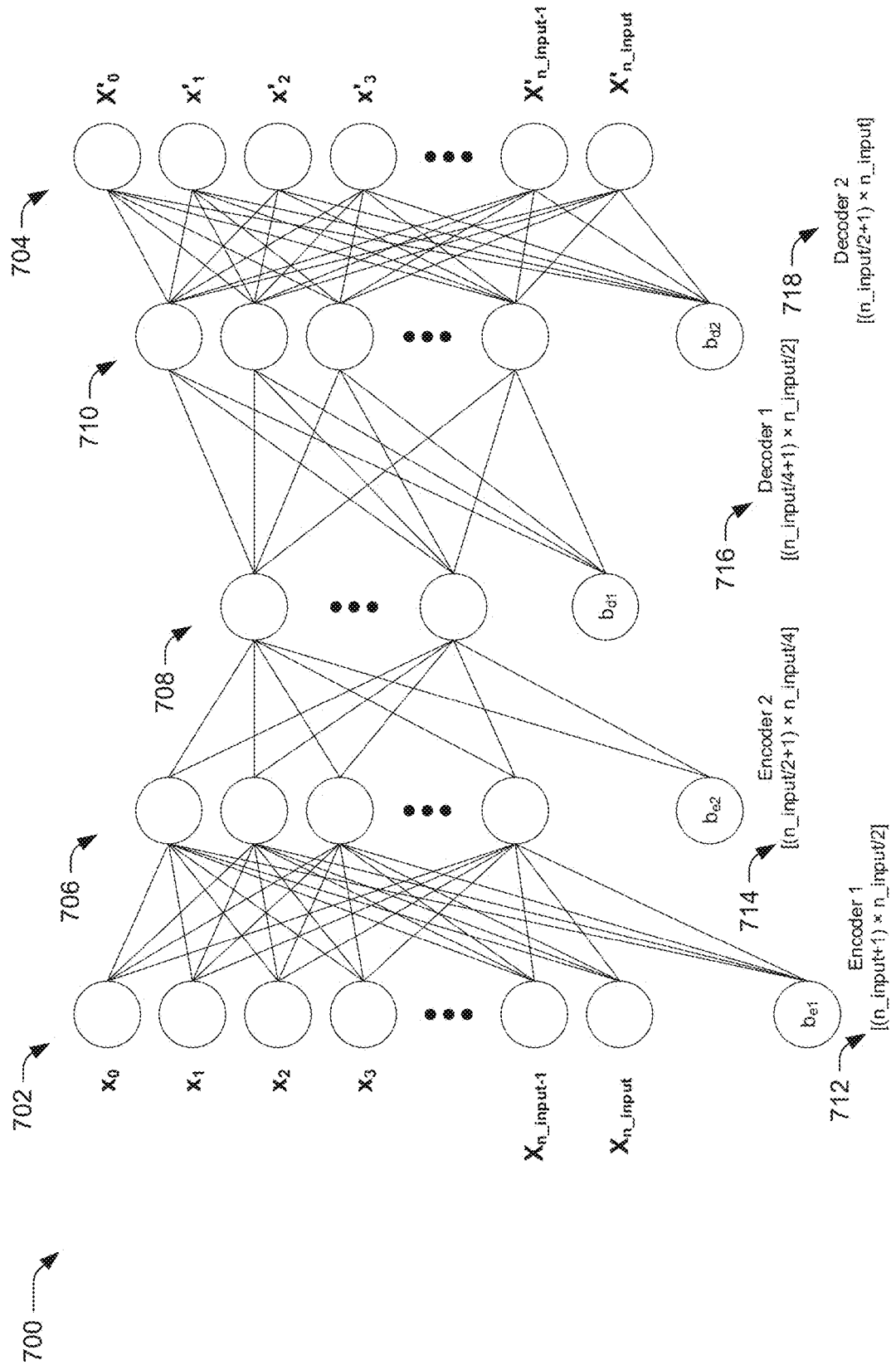
FIG. 7 depicts an example implementation of an autoencoder for completing a matrix having unknown values of numerical and/or categorical attributes.

FIG. 7 depicts an example implementation 700 of an autoencoder for completing a matrix having unknown values of numerical and/or categorical attributes.

The illustrated example 700 includes input layer 702 and output layer 704 as well as first, second, and third hidden layers 706, 708, 710, respectively. In the illustrated example 700, the term "n_input" corresponds to the determined number of columns of the encoded basis matrix 412—the number of attributes represented by columns of the encoded basis matrix 412. As shown, the input layer 702 and the output layer 704 include a number of nodes equal to n_input. In one or more implementations, the first hidden layer 706 includes a number of nodes equal to half n_input (e.g., n_input/2), the second hidden layer 708 includes a number of nodes equal to a quarter of n_input (e.g., n_input/4), and the third hidden layer 710 includes a number of nodes equal to half n_input (e.g., n_input/2). In this type of configuration, a number of nodes of the layers is considered to be symmetrical.

In this example 700, the autoencoder manager module 404 configures the autoencoder 420 with two encoding layers and two decoding layers. Encoder 1 712 and encoder 2 714 correspond to the encoding layers while decoder 1 716 and decoder 2 718 correspond to the decoding layers. In general, the autoencoder manager module 404 configures the hidden layers 706, 708, 710 to have fewer numbers of nodes than the input and output layers 702, 704 to project the data encoded in the cells of the encoded basis matrix 412 to a lower dimension. By projecting this data to a lower dimension, the autoencoder manager module 404 can identify the latent factors of the dataset, e.g., the values entered into the basis matrix. With the latent factors, the autoencoder 420 can reconstruct the data so that the unknown values 206 can be identified from the reconstructed data. In one or more implementations, the autoencoder manager module 404 implements the layers of the autoencoder 420 with a bias term. In the illustrated example 700, the term "+1" in the first dimension of each encoder and decoder represents an added bias term.

In general, the autoencoder manager module 404 activates the autoencoder 420 based on an activation function, such as the sigmoid function. In one or more implementations, the autoencoder manager module 404 activates the autoencoder 420 according to the following activation function (sigmoid function):

$$\sigma(x) = \frac{1}{1+e^{-x}}$$

Here, the term x represents a value of an input node. Given this as the activation function, the autoencoder manager module 404 configures the illustrated layers based on the activation function, such that results of each layer are indicated by a corresponding function. By way of example, the autoencoder manager module 404 configures the autoencoder 420 such that results of the input layer 702 and the corresponding encoder 1 712 are indicated by:

$$\text{Encoder } 1 = \sigma(X*W_{E1} + B_{E1})$$

Here, the term X represents the features provided as input to the autoencoder 420, such as the columns of the encoded basis matrix 412. The term $W_{E1}$ represents the weights of the encoder 1 712 learned from the network, e.g., a vector indicative of the weights for each node of the input layer 702. In one or more implementations, the autoencoder manager module 404 initializes these weights randomly, learns them while training the autoencoder 420 (based on comparisons of the autoencoder's output to the input known values), and modifies the weights in real-time during the training. The term $B_{E1}$ represents the bias of the encoder 1 712 learned from the network, e.g., a vector indicative of the bias for each node of the input layer 702. In one or more implementations, the autoencoder manager module 404 initializes these biases randomly, learns them while training the autoencoder 420, and modifies the biases accordingly. Further, the operator*denotes matrix multiplication (in this case a dot product of two vectors). The autoencoder manager module 404 configures the autoencoder 420 to feed the results of the encoder 1 712 as input to the first hidden layer 706 and thus the encoder 2 714.

In one or more implementations, the autoencoder manager module 404 configures the autoencoder 420 such that results of the first hidden layer 706 and the corresponding encoder 2 714 are indicated by:

$$\text{Encoder } 2 = \sigma(\text{Encoder}1*W_{E2} + B_{E2})$$

In a similar fashion to the first encoder, the term $W_{E2}$ represents the weights of the encoder 2 714 learned from the network and the term $B_{E2}$ represents the bias of the encoder 2 714 learned from the network. The autoencoder manager module 404 configures the autoencoder 420 to feed the results of the encoder 2 714 as input to the second hidden layer 708 and thus the decoder 1 716. In one or more implementations, the autoencoder manager module 404 configures the autoencoder 420 such that results of the second hidden layer 708 and the corresponding decoder 1 716 are indicated by:

$$\text{Decoder } 1 = \sigma(\text{Encoder}2*W_{D1} + B_{D1})$$

Here, the term $W_{D1}$ represents the weights of the decoder 1 716 learned from the network and the term $B_{D1}$ represents the bias of the decoder 1 716 learned from the network. The autoencoder manager module 404 configures the autoencoder 420 to feed the results of the decoder 1 716 as input to the third hidden layer 710 and thus the decoder 2 718. In one or more implementations, the autoencoder manager module 404 configures the autoencoder 420 such that results of the third hidden layer 710 and the corresponding decoder 2 718 are indicated by:

$$X' = \text{Decoder}2 = \sigma(\text{Decoder}1*W_{D2} + B_{D2})$$

Here, the term $W_{D2}$ represents the weights of the decoder 2 718 learned from the network and the term $B_{D2}$ represents the bias of the decoder 2 718 learned from the network. Further, the term X' represents the output of the autoencoder 420. In one or more implementations, X' represents a vector having a same dimensionality as the input to the input layer 702, e.g., a value for each column of the encoded basis matrix 412. Moreover, the autoencoder manager module 404 uses this output to train the autoencoder 420, e.g., by comparing the output values to the input values using one or more cost functions.

Broadly speaking, numerical and categorical attributes are different in nature. Accordingly, the autoencoder manager module 404 treats numerical attributes differently from categorical attributes when using them for optimization of the autoencoder 420. As part of doing so, the autoencoder manager module 404 trains the autoencoder 420 using a "mixed" cost function that combines two separate cost functions, e.g., a combined cost function that is a sum of a numerical-attribute cost function and a separate categorical-attribute cost function.

In one or more implementations, the autoencoder manager module 404 determines a total cost $cost_{total}$ by combining a cost function for numerical attributes $cost_{numerical}$ with a cost function for categorical attributes $cost_{categorical}$, according to the following:

$$cost_{total} = \operatorname*{argmin}_{W,B}(cost_{numerical} + cost_{categorical})$$

Based on this, the autoencoder manager module 404 minimizes the combined cost of the cost function for numerical attributes $cost_{numerical}$ and the cost function for categorical attributes $cost_{categorical}$. In one or more implementations, the autoencoder manager module 404 minimizes this function using one or more minimizing techniques, such as Gradient Descent.

As part of computing the cost of a numerical attribute $cost_{numerical}$, the autoencoder manager module 404 compares a known value of the encoded basis matrix 412 (e.g., $X_{ij}$), input to the autoencoder 420 for position ij, with a corresponding value output by the autoencoder 420 (e.g., $X'_{ij}$). In one or more implementations, the autoencoder manager module 404 computes the numerical attribute cost according to the following:

$$cost_{numerical} = \sum_{i,j}\left((X'_{ij} - X_{ij})\delta_{num_j}\delta_{miss_{ij}}\right)^2$$

Here, the term $\delta_{num_j}$ represents a value from the numerical mask 416 that corresponds to the input value $X_{ij}$ and indicates whether this value corresponds to a numerical attribute (e.g., '1') or not (e.g., '0'). In contrast, the term $\delta_{miss_{ij}}$ represents a value from the missing value mask 414 that corresponds to the input value $X_{ij}$ and indicates whether this value corresponds to a known value 204 (e.g., '1') or an unknown value 206 (e.g., '0'). In general, the autoencoder manager module 404 uses the missing value mask to determine an error of values that are not missing in the encoded basis matrix 412. By using the missing value mask 414, the autoencoder manager module 404 may avoid pre-imputing missing values because these values will not affect the overall cost function.

As noted above, the autoencoder manager module 404 computes the cost for categorical attributes $cost_{categorical}$ separately from the cost of numerical attributes. For instance, the autoencoder manager module 404 may compute the cost of categorical attributes based on cross entropy. In one or more implementations, the autoencoder manager module 404 computes the $cost_{categorical}$ according to the following:

$$cost_{categorical} = -\sum_{i,j}(X_{ij}\ln(X'_{ij}) + (1 - X_{ij})\ln(1 - X'_{ij}))\delta_{cat_j}\delta_{miss_{ij}}$$

Here, the term $\delta_{cat_j}$ represents a value from the categorical mask 418 that corresponds to the input value $X_{ij}$ and indicates whether this value corresponds to a categorical attribute (e.g., '1') or not (e.g., '0'). Again, the term $\delta_{miss_{ij}}$ represents a value from the missing value mask 414 that corresponds to the input value $X_{ij}$ and indicates whether this value corresponds to a known value 204 (e.g., '1') or an unknown value 206 (e.g., '0').

Once trained, the autoencoder 420 is configured to output the complete encoded matrix 422. As output, the complete encoded matrix 422 has a same number of rows and columns as the encoded basis matrix 412. In scenarios where the encoded basis matrix 412 is configured to represent attributes with columns and in which numerical attributes are arranged to together and left of categorical attributes, the autoencoder 420 outputs the complete encoded matrix 422 with corresponding columns for the numerical attributes arranged together and left of the columns for the categorical attributes. Additionally, the values in the cells of the complete encoded matrix 422 range from zero to one, inclusive, e.g., like the values of the encoded basis matrix 412.

In contrast to the encoded basis matrix 412, however, the complete encoded matrix 422 includes a value in each cell, e.g., a known value or an imputed value. From the complete encoded matrix 422, the matrix imputation module 120 generates a complete basis matrix to have a same form as the incomplete basis matrix. One effect of this is that groups of columns corresponding to a given categorical attribute are merged back into a single column, such that the cells in the single column can have any of the possible values of the categorical attribute, e.g., any of the set including {'AL', 'AK' . . . 'WI', and 'WY' } rather than '1' or '0'. In this context, consider FIG. 8.

Figure 8:
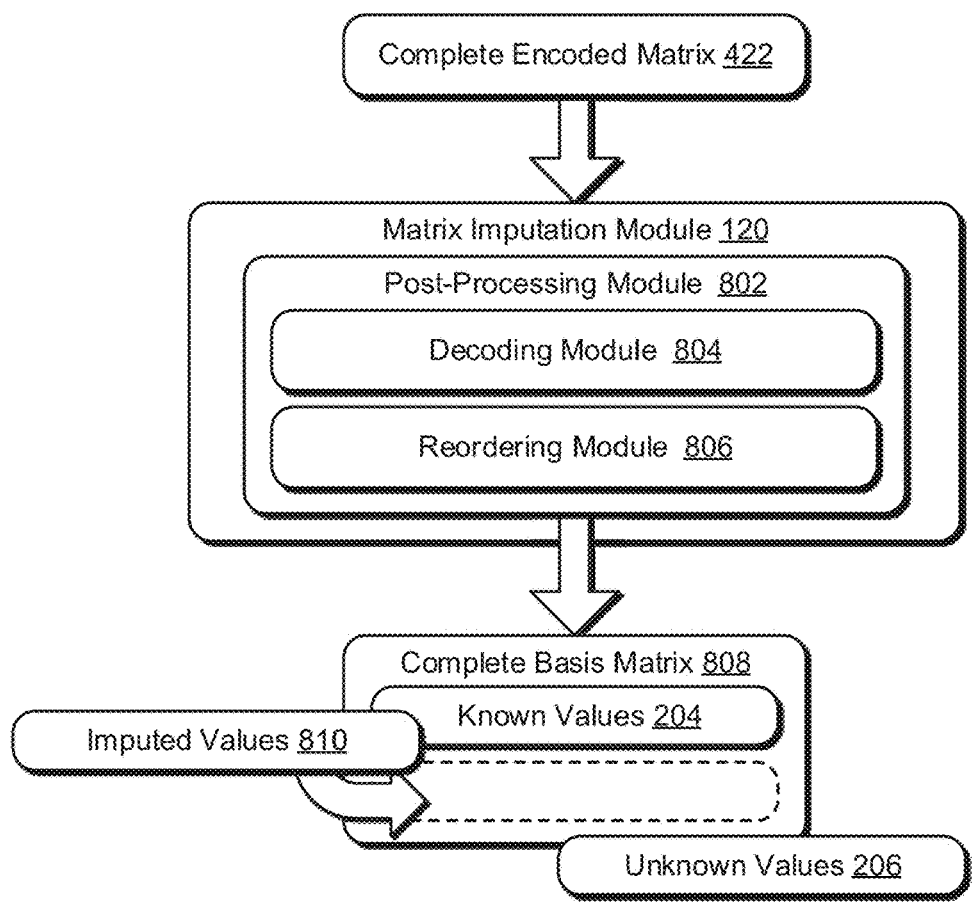
FIG. 8 depicts an example implementation in which the recommendation provision system of FIG. 1 replaces unknown values of an incomplete matrix with known values to generate a complete matrix.

FIG. 8 depicts an example implementation 800 in which the recommendation provision system of FIG. 1 replaces unknown values of an incomplete matrix with known values to generate a complete matrix. The illustrated example 800 includes from FIG. 1 the matrix imputation module 120 and from FIG. 4 the complete encoded matrix.

In this example, the matrix imputation module 120 includes post-processing module 802, which includes decoding module 804 and reordering module 806. In general, the post-processing module 802 represents functionality of the matrix imputation module 120 to receive the complete encoded matrix 422 as input and from the autoencoder 420. In general, the post-processing module 802 processes the complete encoded matrix 422 in real-time to produce complete basis matrix 808, which has a same structure as the incomplete basis matrix 202. By way of example, the decoding module 804 is configured to denormalize values of the cells that correspond to numerical attributes. The decoding module 804 may do so, in part, based on information saved about the normalizing performed by the normalization module 406.

The decoding module 804 is also configured to convert groups of multiple columns corresponding to categorical attributes back into a single column for those attributes. In this way, a cell in one of these single columns can have any of the possible values of the corresponding categorical attribute. In other words, the decoding module 804 is also configured to decode the encoding applied by the categorical encoding module 408. The decoding module 804 may decode the encoding, in part, by predicting the categorical attributes, e.g., by identifying levels of the categorical attributes that obtained a highest score as output from the output layer 704 of the autoencoder 420. Once this level is determined, the decoding module 804 assigns a name of the column as a level for that attribute. The decoding module 804 may perform this predicting for each of the categorical attributes.

The reordering module 806 is configured to reorder the attributes so that the attributes have a same order as in the incomplete basis matrix 202. Rather than having each of the numerical attributes arranged together and in leftmost columns of the matrix (and the categorical attributes arranged together and to the right of a last numerical attribute), the reordering module 806 arranges the attribute columns of the complete basis matrix 808 so that they have a same order as in the incomplete basis matrix 202. As depicted, the matrix imputation module 120 generates the complete basis matrix 808 to include the known values 204 (e.g., from the incomplete basis matrix 202), and also to include imputed values 810 in place of the unknown values 206. The illustrated imputed values 810 represent the values determined by the autoencoder 420 and translated back to an original-matrix form by the post-processing module 802. As one example of the complete basis matrix 808, consider FIG. 9.

Figure 9:
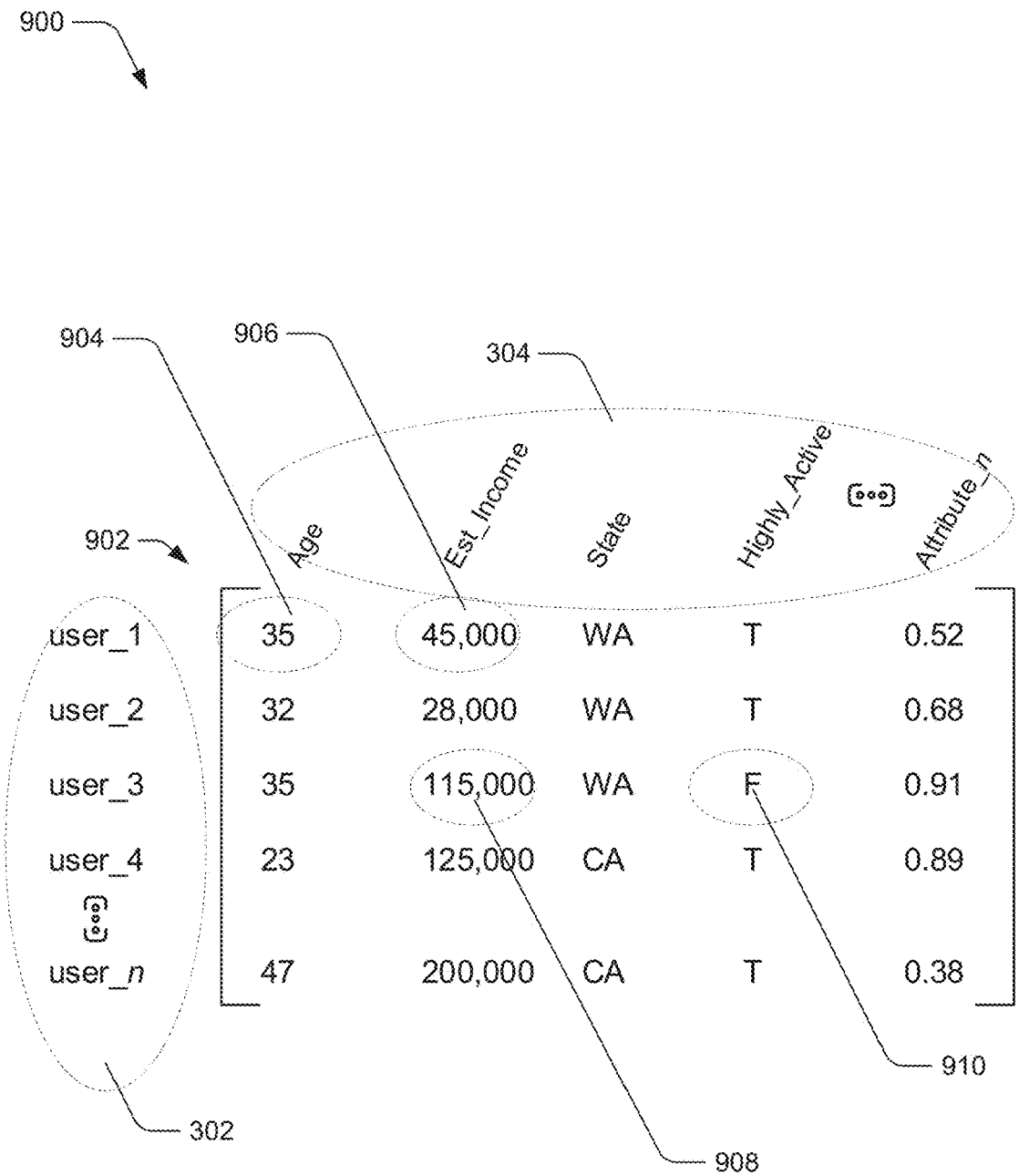
FIG. 9 depicts an example matrix that has been completed using deep learning.

FIG. 9 depicts at 900 an example matrix that has been completed using deep learning. In particular, FIG. 9 includes complete matrix 902, which corresponds to the complete basis matrix 808 of FIG. 8. Further, the complete matrix 902 may correspond to a completed version of the matrix illustrated in FIG. 3. FIG. 5 thus represents a continuation of the scenario depicted in the previous figures.

Like the example depicted in FIG. 3, the complete matrix 902 includes rows that correspond to the users 302 and columns representing the different attributes 304 that can be used to describe the users 302. Also like in the example depicted in FIG. 3, each of the cells of the complete matrix 902 that correspond to 'user_1' are depicted having values, e.g., the same values as in FIG. 3. Indeed, first cell 904 has a same value as the first cell 306 (e.g., '35') and second cell 906 has a same value as the second cell 308 (e.g., '45,000'). In contrast to the incomplete matrix of FIG. 3, however, each cell of the complete matrix 902 each a value. Consider first and second imputed cells 908, 910 of the complete matrix 902, for instance. In the incomplete matrix of FIG. 3, the third cell 310 and the fourth cell 312 are depicted missing values, e.g., with the three dashes indicating a null value. In the continuing scenario, the third cell 310 of FIG. 3 corresponds to the first imputed cell 908 and the fourth cell 312 of FIG. 3 corresponds to the second imputed cell 910. Rather than depicted as missing values, however, the first and second imputed cells 908, 910 are depicted with non-null values. These values correspond to the imputed values 810.

Having discussed example details of the techniques for matrix completion and recommendation provision with deep learning, consider now some example procedures to illustrate additional aspects of the techniques.

Example Procedures

This section describes example procedures for matrix completion and recommendation provision with deep learning in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the recommendation provision system 106 of FIG. 1 that makes use of a matrix imputation module 120.

Figure 10:
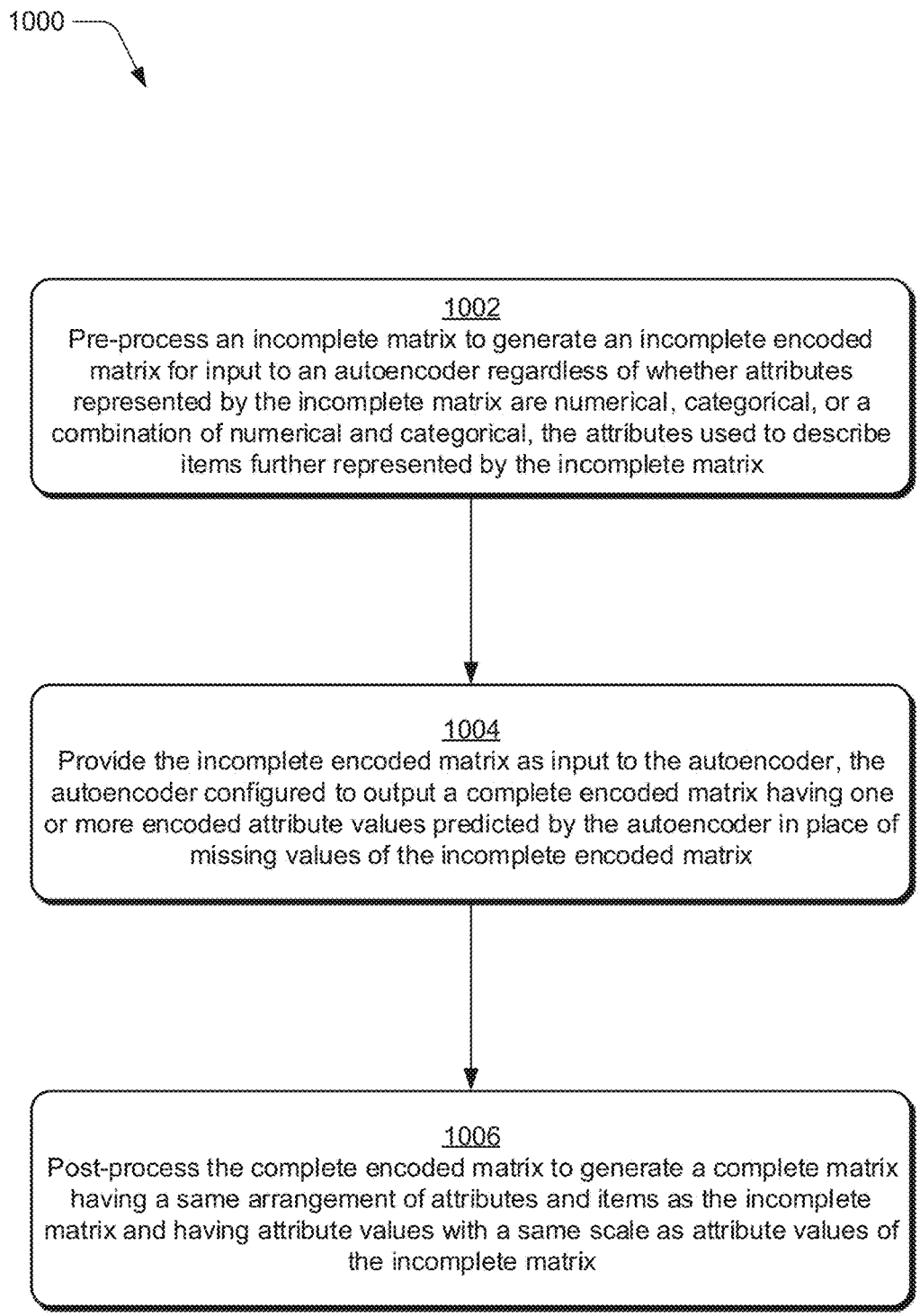
FIG. 10 depicts a procedure in an example implementation in which unknown values of an incomplete matrix are imputed using deep learning to generate a complete matrix.

FIG. 10 depicts an example procedure 1000 in which unknown values of an incomplete matrix are imputed using deep learning to generate a complete matrix. An input incomplete matrix is pre-processed to generate an incomplete encoded matrix for input to an autoencoder (block 1002). In accordance with the principles discussed herein, the pre-processing is performed to generate the incomplete encoded matrix regardless of whether attributes represented by the input incomplete matrix are numerical, categorical, or a combination of numerical and categorical. Broadly speaking, these attributes are used to describe items further represented by the input incomplete matrix. By way of example, the pre-processing module 402 pre-processes the incomplete basis matrix 202 as described in more detail above and below to generate the encoded basis matrix 412 in real-time.

The incomplete encoded matrix is provided as input to the autoencoder (block 1004). In accordance with the principles discussed herein, the auto encoder is configured to output a complete encoded matrix having one or more encoded attribute values predicted by the autoencoder in place of missing values of the incomplete encoded matrix. By way of example, the matrix imputation module 120 provides the encoded basis matrix 412 to the autoencoder manager module 404. The autoencoder manager module 404 can thus use the encoded basis matrix 412 as input to the autoencoder 420. Responsive to receiving the encoded basis matrix 412 as input, the autoencoder 420 outputs the complete encoded matrix 422 in real-time. This complete encoded matrix 422 includes one or more encoded attribute values predicted by the autoencoder 420 in place of missing values.

The complete encoded matrix is post-processed to generate a complete matrix (block 1006). In accordance with the principles discussed herein, the complete matrix has a same arrangement of attributes and items as the input incomplete matrix and also has attribute values with a same scale as attribute values of the input incomplete matrix. By way of example, the post-processing module 802 post-processes the complete encoded matrix 422 to generate the complete basis matrix 808 so that the complete basis matrix 808 has a same arrangement of attributes and items as the incomplete basis matrix 202 and also has attribute values with a same scale as attribute values of the incomplete basis matrix 202.

Figure 11:
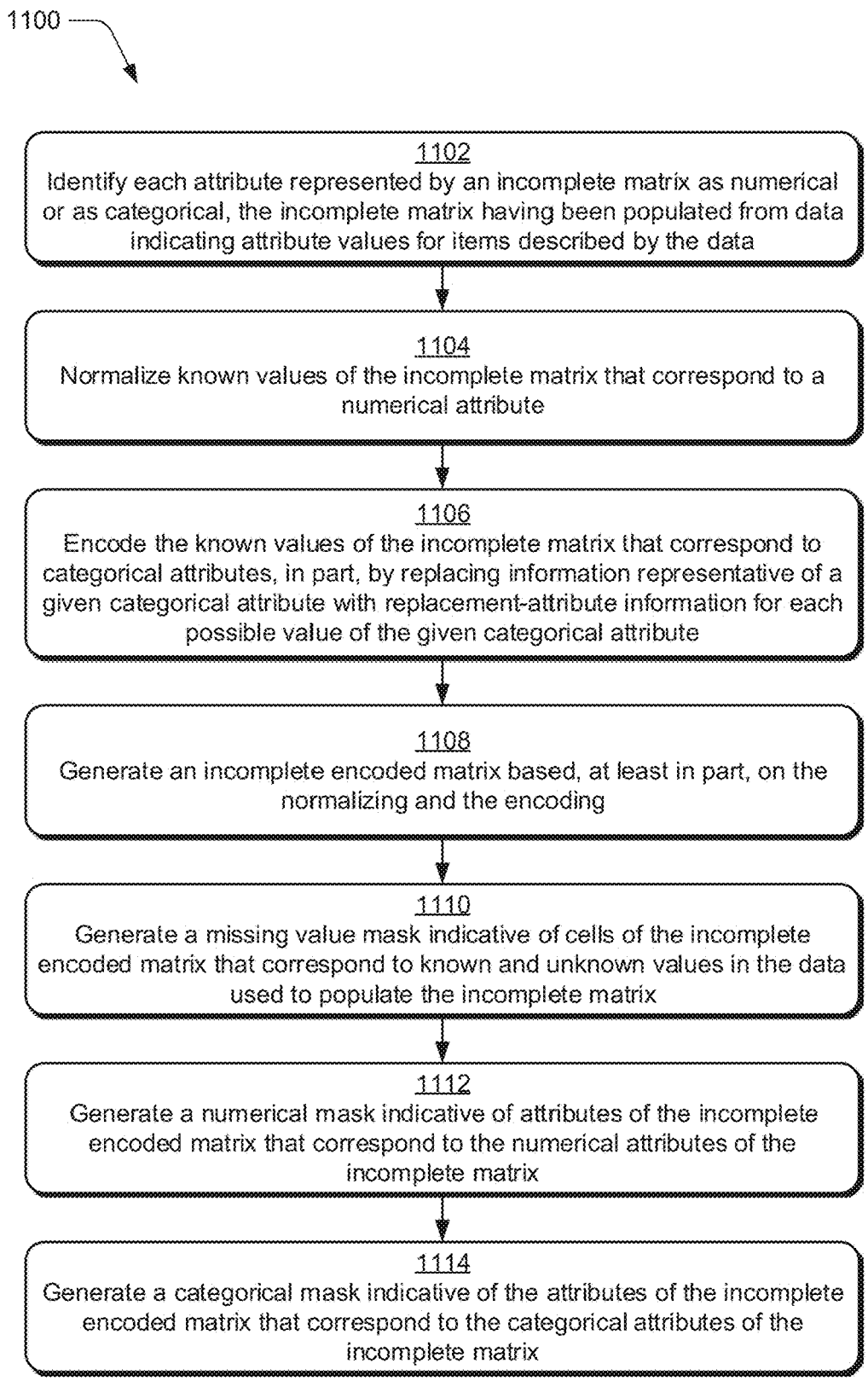
FIG. 11 depicts a procedure in an example implementation in which an incomplete matrix is pre-processed for input to an autoencoder.

FIG. 11 depicts an example procedure 1100 in which an incomplete matrix is pre-processed for input to an autoencoder. Each attribute represented by an input incomplete matrix is identified as being numerical or categorical (block 1102). In accordance with the principles discussed herein, the input incomplete matrix was previously populated from data indicating attribute values for items described by the data. By way of example, the pre-processing module 402 identifies each attribute column of the incomplete matrix depicted in FIG. 3 as corresponding to a numerical attribute or to a categorical attribute.

Known values of the input incomplete matrix that correspond to numerical attributes are normalized (block 1104). By way of example, the normalization module 406 normalizes the known values 204 of the incomplete basis matrix 202 that correspond to numerical attributes, such as the known values of FIG. 3's input incomplete matrix in the column labeled 'Age'.

Known values of the input incomplete matrix that correspond to categorical attributes are encoded (block 1106). In accordance with the principles discussed herein, these values are encoded, in part, by replacing information representative of a given categorical attribute with replacement-attribute information for each possible value of the given categorical attribute. By way of example, the categorical encoding module 408 encodes the known values 204 of the incomplete basis matrix 202 that correspond to categorical attributes, such as the known values of FIG. 3's input incomplete matrix in cells of the column labeled 'State'. To encode these values, the categorical encoding module 408 replaces the attribute column labeled 'State' with new columns for each value the 'State' attribute can have, e.g., one new column for each value in the set of {'AL', 'AK' . . . 'WI', and 'WY' } as illustrated in FIG. 5

An incomplete encoded matrix is generated based, at least in part, on the normalizing and the encoding (block 1108). By way of example, the pre-processing module 402 generates the encoded basis matrix 412 based on the normalizing of block 1104 and the encoding of block 1106. To clarify, this encoding and the corresponding decoding of the matrix is different than further encoding and decoding performed by encoders and decoders of an autoencoder to predict the values. Broadly speaking, here encoding refers to the normalization and masking and the corresponding decoding refers to the reverse of this process, in part, to decode the encoded complete matrix.

A missing value mask is generated (block 1110). In accordance with the principles discussed herein, the missing value mask is indicative of cells of the incomplete encoded matrix that correspond to known and unknown values. By way of example, the mask generation module 410 generates the missing value mask 414 to indicate the cells of the encoded basis matrix 412 that correspond to known and unknown values.

A numerical mask is generated that is indicative of attributes of the incomplete encoded matrix that correspond to numerical attributes of the input incomplete matrix (block 1112). By way of example, the mask generation module 410 generates the numerical mask 416 to indicate the attributes of the encoded basis matrix 412 that correspond to numerical attributes.

A categorical mask is generated that is indicative of attributes of the incomplete encoded matrix that correspond to categorical attributes of the input incomplete matrix (block 1114). By way of example, the mask generation module 410 generates the categorical mask 418 to indicate the attributes of the encoded basis matrix 412 that correspond to categorical attributes.

The incomplete encoded matrix generated at block 1108, the missing value mask generated at block 1110, the numerical mask generated at block 1112, and the categorical mask generated at block 1114 are provided as input to a machine-learning module, e.g., autoencoder 420, to impute the unknown values in real-time.

Figure 12:
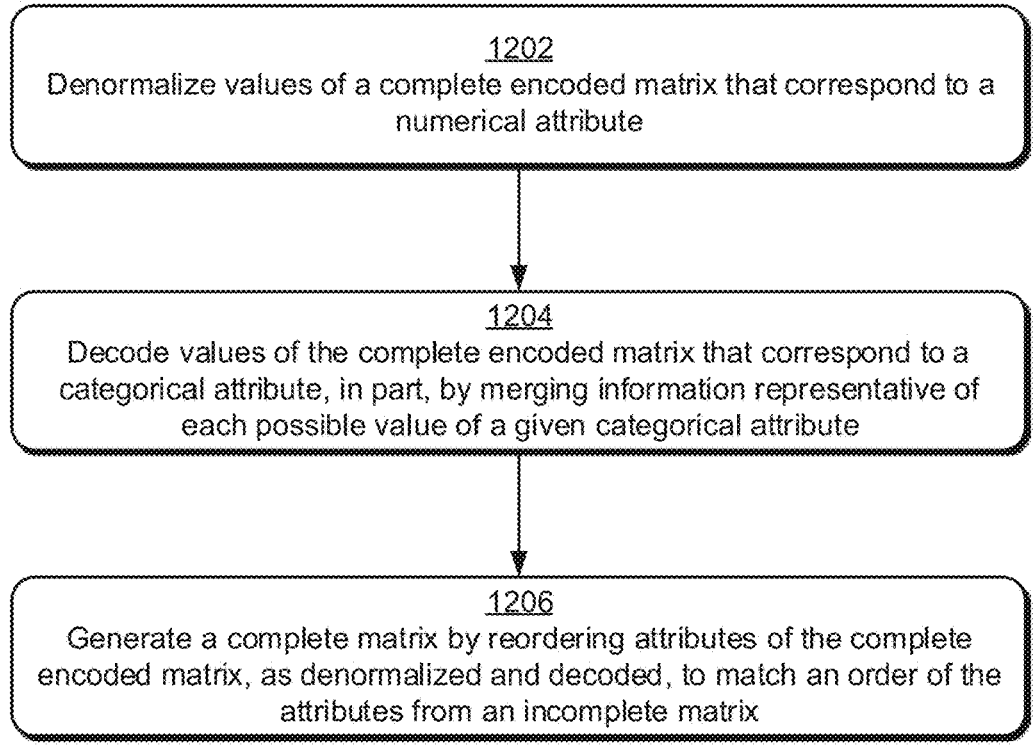
FIG. 12 depicts a procedure in an example implementation in which a complete encoded matrix is received from an autoencoder and post-processed to match a format of an input incomplete matrix.

FIG. 12 depicts an example procedure 1200 in which a complete encoded matrix is received from an autoencoder and post-processed to match a format of an input incomplete matrix. Values of the complete encoded matrix that correspond to a numerical attribute are denormalized (block 1202). By way of example, the decoding module 804 denormalizes values of the complete encoded matrix 422 that correspond to a numerical attribute.

Values of the complete encoded matrix that correspond to a categorical attribute are decoded, in part, by merging information representative of each possible value of a given categorical attribute (block 1204). By way of example, the decoding module 804 decodes values of the complete encoded matrix 422 that correspond to a categorical attribute. To decode these values for a given categorical attribute, the decoding module 804 merges the information of the complete encoded matrix 422 for each value of the given categorical attribute, e.g., multiple columns that each represent a possible value of the given categorical attribute are merged into a single column indicative of the given categorical attribute.

An output complete matrix is generated, in part, by reordering attributes of the complete encoded matrix, as denormalized and decoded, to match an order of the attributes from an input incomplete matrix (block 1206). By way of example, the reordering module 806 reorders attributes of the complete encoded matrix 422, after being denormalized at block 1202 and decoded at block 1204, to match an order of the attributes in the incomplete basis matrix 202.

Having described example procedures in accordance with one or more implementations, consider now an example system and device that can be utilized to implement the various techniques described herein.

Example System and Device

Figure 13:
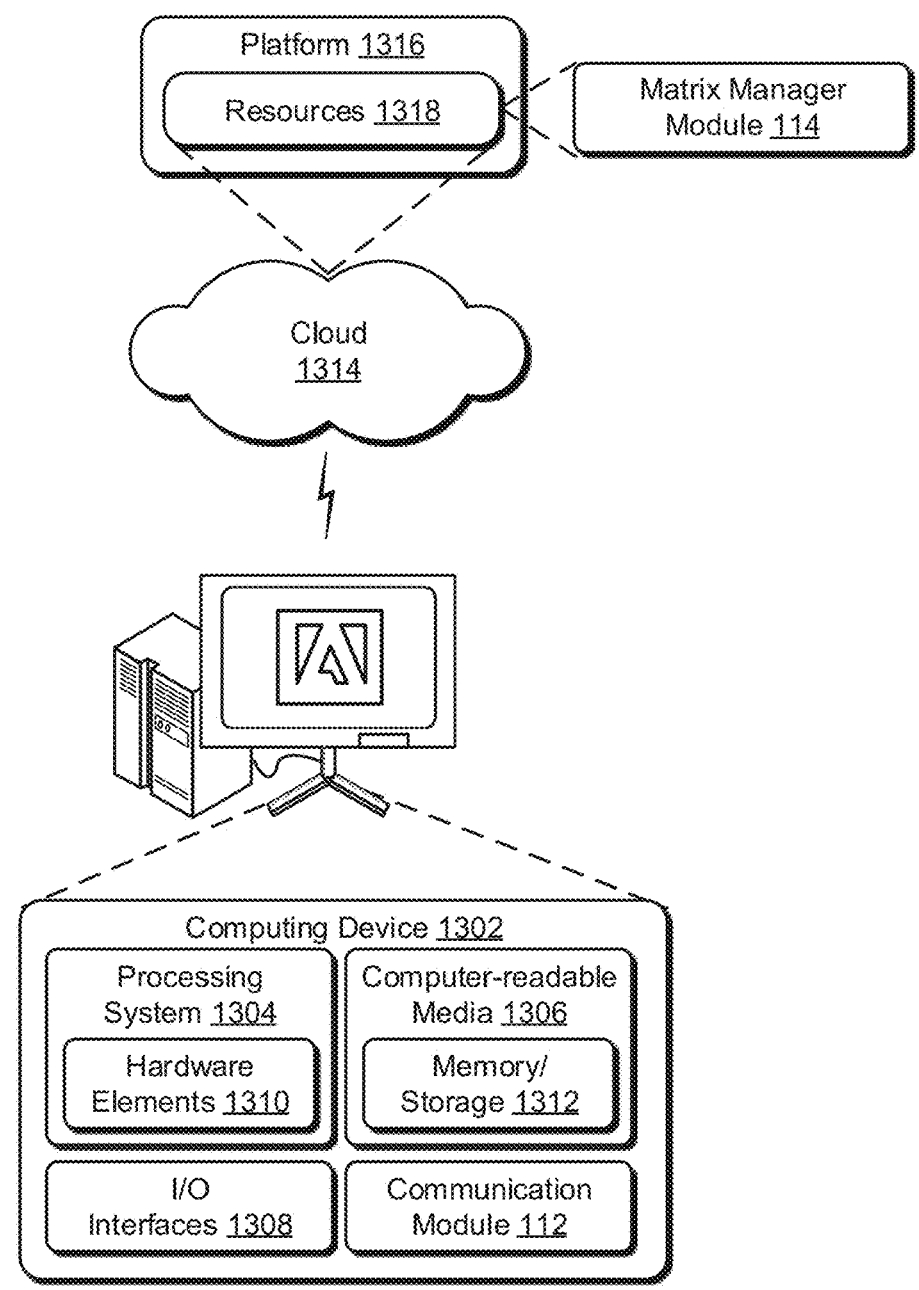
FIG. 13 illustrates an example system including various components of an example device that can be implemented as any type of computing device as described and/or utilized with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the matrix manager module 114 and the communication module 112. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
encoding an incomplete matrix to generate an incomplete encoded matrix in which known values of the incomplete matrix are encoded for input to an autoencoder regardless of whether attributes represented by the incomplete matrix are numerical, categorical, or a combination of numerical and categorical, the known values corresponding to the attributes to describe items further represented by the incomplete matrix, the encoding including:
generating a numerical mask indicative of the attributes of the incomplete encoded matrix that correspond to identified numerical attributes, the numerical mask including a number of cells that corresponds to a number of columns of the incomplete encoded matrix, and each cell of the numerical mask indicating whether an attribute of a corresponding column of the incomplete encoded matrix is a numerical attribute or not; and
generating a categorical mask indicative of the attributes of the incomplete encoded matrix that correspond to identified categorical attributes, the categorical mask including the number of cells, and each cell of the categorical mask indicating whether the attribute of the corresponding column of the incomplete encoded matrix is a categorical attribute or not;
providing at least the incomplete encoded matrix and a missing value mask as input to the autoencoder, the missing value mask having a same number of rows and a same number of columns as the incomplete encoded matrix; and
decoding a complete encoded matrix output by the autoencoder, the complete encoded matrix having encoded values imputed in real-time by the autoencoder in place of unknown values of the incomplete encoded matrix, and the decoding effective to generate a complete matrix in which imputed encoded values are converted to have a same format as the known values that correspond to a same attribute.

2. The method of claim 1, wherein the encoding encodes the known values of the incomplete matrix so that corresponding values range from zero to one in the incomplete encoded matrix.

3. The method of claim 1, wherein the encoding comprises:
identifying each of the attributes represented by the incomplete matrix as a numerical attribute or categorical attribute;
normalizing the known values that correspond to an identified numerical attribute;
categorically encoding the known values that correspond to an identified categorical attribute; and
generating the incomplete encoded matrix based, at least in part, on the normalizing and the categorical encoding.

4. The method of claim 3, wherein the categorical encoding comprises:
determining possible values of the identified categorical attribute;
replacing information corresponding to the identified categorical attribute in the incomplete matrix with replacement information representing each of the possible values in the incomplete encoded matrix; and
for a known value corresponding to the identified categorical attribute, entering:
a first encoded value into the replacement information representing a corresponding possible value, the first encoded value indicating correspondence of the known value to the corresponding possible value represented by the replacement information; and
a second encoded value into the replacement information representing other possible values, the second encoded value indicating that the known value does not correspond to the other possible values represented by the replacement information.

5. The method of claim 4, wherein the information corresponding to the identified categorical attribute comprises a column of the incomplete matrix and the replacement information comprises columns of the incomplete encoded matrix each representing a different possible value.

6. The method of claim 1, wherein the encoding further comprises generating the missing value mask, wherein the missing value mask further includes a same number of cells as the incomplete encoded matrix, and each cell of the missing value mask indicates whether a corresponding cell of the incomplete encoded matrix has a known value or an unknown value.

7. The method of claim 6, further comprising providing the incomplete encoded matrix, the missing value mask, the numerical mask, and the categorical mask as the input to the autoencoder.

8. The method of claim 1, further comprising training the autoencoder to impute the encoded values for the unknown values based on a cost function that combines a first cost function and a second cost function, the first cost function applied to values of encoded numerical attributes, and the second cost function applied to values of encoded categorical attributes.

9. The method of claim 1, wherein the attributes represented by the incomplete matrix are a combination of numerical and categorical attributes.

10. The method of claim 1, further comprising generating the incomplete matrix based on data describing the items in terms of the attributes.

11. The method of claim 1, further comprising determining one or more recommendations for a client device user based, at least in part, on the complete matrix.

12. The method of claim 1, further comprising generating one or more predictive analytics based, at least in part, on the complete matrix.

13. A system comprising:
a pre-processing module implemented at least partially in hardware of at least one computing device to encode an incomplete matrix effective to generate an incomplete encoded matrix in which known values of the incomplete matrix are encoded for input to an autoencoder regardless of whether attributes represented by the incomplete matrix are numerical, categorical, or a combination of numerical and categorical, the incomplete matrix encoded based on:
a numerical mask indicative of the attributes of the incomplete encoded matrix that correspond to identified numerical attributes, the numerical mask including a number of cells that corresponds to a number of columns of the incomplete encoded matrix, and each cell of the numerical mask indicating whether an attribute of a corresponding column of the incomplete encoded matrix is a numerical attribute or not; and a categorical mask indicative of the attributes of the incomplete encoded matrix that correspond to identified categorical attributes, the categorical mask including the number of cells, and each cell of the categorical mask indicating whether the attribute of the corresponding column of the incomplete encoded matrix is a categorical attribute or not;

a machine-learning model manager implemented at least partially in the hardware of the at least one computing device to train an autoencoder to:

receive as input the incomplete encoded matrix;

receive as additional input a missing value mask having a same number of cells as the incomplete encoded matrix, wherein each cell of the missing value mask indicates whether a corresponding cell of the incomplete encoded matrix has a known value or an unknown value; and output a complete encoded matrix by imputing encoded values in place of unknown values of the incomplete encoded matrix; and a post-processing module implemented at least partially in the hardware of the at least one computing device to decode the complete encoded matrix effective to generate a complete matrix in which imputed encoded values are converted to have a same format as the known values corresponding to a same attribute.

14. The system of claim 13, further comprising a normalization module to normalize the known values that correspond to a numerical attribute.

15. The system of claim 14, wherein the normalization module normalizes the known values corresponding to the numerical attribute according to Min Max Scaling.

16. The system of claim 13, further comprising a categorical encoding module to categorically encode the known values that correspond to a categorical attribute, in part, by replacing information corresponding to the categorical attribute in the incomplete matrix with replacement information representing each possible value of the categorical attribute.

17. The system of claim 16, wherein the categorical encoding module encodes the known values corresponding to the categorical attribute according to One-Hot encoding.

18. The system of claim 13, further comprising a machine-learning model trained to at least one of:

determine one or more recommendations for a client device user based, in part, on the complete matrix; or generate one or more predictive analytics based, in part, on the complete matrix.

19. One or more non-transitory computer-readable storage media storing instructions that are executable by one or more processors to perform operations including:

encoding an incomplete matrix to generate an incomplete encoded matrix in which known values of the incomplete matrix are encoded for input to an autoencoder regardless of whether attributes represented by the incomplete matrix are numerical, categorical, or a combination of numerical and categorical, the encoding including:

generating a numerical mask indicative of the attributes of the incomplete encoded matrix that correspond to identified numerical attributes, the numerical mask including a number of cells that corresponds to a number of columns of the incomplete encoded matrix, and each cell of the numerical mask indicating whether an attribute of a corresponding column of the incomplete encoded matrix is a numerical attribute or not; and generating a categorical mask indicative of the attributes of the incomplete encoded matrix that correspond to identified categorical attributes, the categorical mask including the number of cells, and each cell of the categorical mask indicating whether the attribute of the corresponding column of the incomplete encoded matrix is a categorical attribute or not;

providing the incomplete encoded matrix as input to the autoencoder;

providing a missing value mask as additional input to the autoencoder, the missing value mask having a same number of rows and a same number of columns as the incomplete encoded matrix; and decoding a complete encoded matrix output by the autoencoder, the complete encoded matrix having encoded values imputed in real-time by the autoencoder in place of unknown values of the incomplete encoded matrix, and the decoding effective to generate a complete matrix in which imputed encoded values are converted to have a same format as the known values that correspond to a same attribute.

20. The one or more non-transitory computer-readable storage media of claim 19, wherein the encoding further includes categorically encoding known values corresponding to a categorical attribute according to One-Hot encoding.

* * * * *